United States Patent
Ohtani et al.

(10) Patent No.: US 12,291,368 B2
(45) Date of Patent: May 6, 2025

(54) INSPECTION DEVICE, PACKAGING SHEET MANUFACTURING DEVICE, AND PACKAGING SHEET MANUFACTURING METHOD

(71) Applicant: CKD CORPORATION, Aichi (JP)

(72) Inventors: Takamasa Ohtani, Aichi (JP); Tsuyoshi Ohyama, Aichi (JP); Norihiko Sakaida, Aichi (JP)

(73) Assignee: CKD CORPORATION, Aichi (JP)

( * ) Notice: Subject to any disclaimer, the term of this patent is extended or adjusted under 35 U.S.C. 154(b) by 449 days.

(21) Appl. No.: 17/462,150

(22) Filed: Aug. 31, 2021

(65) Prior Publication Data

US 2021/0387761 A1 Dec. 16, 2021

Related U.S. Application Data

(63) Continuation of application No. PCT/JP2020/004307, filed on Feb. 5, 2020.

(30) Foreign Application Priority Data

Apr. 24, 2019 (JP) .................................. 2019-082645

(51) Int. Cl.
*B65B 57/00* (2006.01)
*B65B 9/04* (2006.01)
(Continued)

(52) U.S. Cl.
CPC ................ *B65B 57/00* (2013.01); *B65B 9/04* (2013.01); *B65B 61/06* (2013.01); *G01N 23/04* (2013.01); *G01N 23/18* (2013.01)

(58) Field of Classification Search
CPC .......... B65B 57/00; B65B 9/04; B65B 61/06; B65B 57/02; B65B 57/04; B65B 57/10; B65B 57/14; G01N 23/04; G01N 23/18
(Continued)

(56) References Cited

U.S. PATENT DOCUMENTS 5,359,525 A * 10/1994 Weyenberg ...... G05B 19/41875
356/429
6,404,910 B1 * 6/2002 Ungpiyakul ...... A61F 13/15772
382/141
(Continued)

FOREIGN PATENT DOCUMENTS

JP 2001-253416 A 9/2001
JP 2014-085190 A 5/2014
(Continued)

OTHER PUBLICATIONS

International Search Report issued in corresponding International Application No. PCT/JP2020/004307, mailed on Apr. 21, 2020 (7 pages).

(Continued)

*Primary Examiner* — Sameh Tawfik
(74) *Attorney, Agent, or Firm* — Osha Bergman Watanabe & Burton LLP

(57) ABSTRACT

An inspection device includes: X-ray irradiators that irradiates, with a predetermined X-ray from a first film-side, inspection ranges that respectively correspond to positions of packaging sheets to be separated from the packaging film; an imaging device that is disposed on a second film-side and opposed to the X-ray irradiators across the packaging film, that comprises an X-ray detector comprising detection elements arrayed along the film width direction and detecting the X-ray transmitted through the packaging film, and that successively outputs X-ray transmission image data obtained every time the packaging film is conveyed by a predetermined amount; and a controller that inspects the packaging sheet based on the X-ray transmission image data obtained by the imaging device.

5 Claims, 10 Drawing Sheets

(51) Int. Cl.
*B65B 61/06* (2006.01)
*G01N 23/04* (2018.01)
*G01N 23/18* (2018.01)

(58) Field of Classification Search
USPC .......................................................... 53/450
See application file for complete search history.

(56) References Cited

U.S. PATENT DOCUMENTS

| | | | | |
|---|---|---|---|---|
| 10,065,755 | B2* | 9/2018 | Palumbo | B65B 31/021 |
| 10,524,961 | B2* | 1/2020 | Hudson | B41M 3/00 |
| 10,621,719 | B2* | 4/2020 | Li | G06K 15/021 |
| 10,843,455 | B2* | 11/2020 | Strasemeier | A61F 13/51394 |
| 2015/0096263 | A1* | 4/2015 | Ehrmann | B65B 41/16 |
| | | | | 53/411 |
| 2017/0267001 | A1* | 9/2017 | Hayashi | B65H 23/1825 |
| 2019/0127101 | A1* | 5/2019 | Merk | B26F 1/44 |

FOREIGN PATENT DOCUMENTS

| | | |
|---|---|---|
| JP | 2014-145733 A | 8/2014 |
| JP | 2014-213871 A | 11/2014 |
| JP | 2015-078921 A | 4/2015 |
| JP | 2016-003903 A | 1/2016 |
| JP | 2018-087745 A | 6/2018 |
| JP | 2018-096700 A | 6/2018 |

OTHER PUBLICATIONS

Written Opinion issued in corresponding International Application No. PCT/JP2020/004307, mailed on Apr. 21, 2020 (4 pages).
Office Action issued in corresponding Japanese Patent Application No. 2019-082645, mailed on Jul. 14, 2021 (6 pages).
International Preliminary Report on Patentability issued in corresponding International Application No. PCT/JP2020/004307, mailed on Nov. 4, 2021 (12 pages).

* cited by examiner

INSPECTION DEVICE, PACKAGING SHEET MANUFACTURING DEVICE, AND PACKAGING SHEET MANUFACTURING METHOD

BACKGROUND

Technical Field

The present disclosure relates to an inspection device used in manufacture of a packaging sheet with tablets placed therein, a packaging sheet manufacturing apparatus, and a packaging sheet manufacturing method.

Description of Related Art

PTP (press through package) sheets have widely been used as packaging sheets for packaging tablets in the field of pharmaceutical products, food products and the like.

A PTP sheet is comprised of a container film with pocket portions formed to place tablets therein; and a cover film mounted to the container film such as to seal an opening side of the pocket portions. A tablet placed in a pocket portion is taken out by pressing the pocket portion from outside to cause the tablet placed in the pocket portion to break through the cover film serving as the cover.

This PTP sheet is manufactured through, for example, a pocket portion forming process of forming pocket portions in a container film in a belt-like form; a filling process of filling the pocket portions with tablets; a mounting process of mounting a cover film in a belt-like form to a flange portion formed around the pocket portions in the container film so as to seal an opening side of the pocket portion; and a separation process of separating a PTP sheet as a final product from a PTP film in a belt-like form provided by mounting the respective films to each other.

In the case of manufacturing such a PTP sheet, for example, an inspection for any abnormality of a tablet (for example, the presence or the absence of a tablet in each pocket portion or breaking or crack of a tablet) and an inspection for any abnormality of a flange portion (for example, the presence or the absence of any foreign substance in the flange portion) are generally performed in the manufacturing process (after the process of placing the tablets in the pocket portions and before the process of separating the PTP sheet from the PTP film).

As a recent trend, from the standpoint of improving the light blocking effect and the moisture-proof property, both the container film and the cover film are often made of opaque materials including aluminum or the like as a base material.

In this case, the respective inspections described above are performed by using an X-ray inspection device or the like. The X-ray inspection device generally includes an X-ray generator (X-ray source) configured to irradiate a continuously conveyed PTP film with X-ray and an X-ray detector configured to detect the X-ray transmitted through the PTP film, and performs various inspections based on the transmission amount of X-ray (as described in, for example, Patent Literature 1).

PATENT LITERATURE

Patent Literature 1: JP 2014-145733A

With a view to increasing the production efficiency, one type of PTP packaging machine that manufactures packing sheets by separating a PTP film conveyed in a belt-like form at a plurality of positions in a width direction of the PTP film into sheet units has recently been popular as the PTP packaging machine of manufacturing the PTP sheet.

In the case where an X-ray inspection is performed in the manufacturing process of the PTP sheet by this type of PTP packaging machine, there is a need to set an X-ray irradiation range (inspection range) over a wide range in the width direction of the PTP film.

The intensity of X-ray radially radiated from an X-ray source, however, attenuates in inverse proportion to the square of distance. A difference in the incident angle of X-ray to the PTP film causes a difference in the inspection capability. The irradiation angle of X-ray used for an inspection of the PTP sheet is thus not allowed to extend unlimitedly but is limited to an angle that enables a predetermined inspection range on the PTP film to be substantially uniformly irradiated.

As a result, this is likely to increase the distance from the PTP film to the X-ray source in the conventional X-ray inspection device and to expand the size of the inspection device.

For example, as shown in FIG. 13, in a conventional X-ray inspection device 100 provided with an X-ray generator 101 (an X-ray source 101a) configured to irradiate a PTP film 103 with X-ray and an X-ray detector 102 configured to detect the X-ray transmitted through the PTP film 103, when a predetermined range W0 in a width direction of the PTP film 103 is to be irradiated with X-ray in the state that the irradiation angle of X-ray radiated from the X-ray generator 101 is set to a predetermined angle θ, the distance between the PTP film 103 and the X-ray generator 101 is to be equal to or larger than a distance H0. Here H0=W0/tan (θ/2).

Furthermore, the configuration of placing the X-ray source away from the PTP film decreases the amount of X-ray reaching the PTP film as described above. This makes it difficult to ensure a transmission amount of X-ray required for an inspection and is likely to reduce the inspection accuracy. Employing a high-power X-ray source to ensure the required amount of X-ray is, on the contrary, likely to expand the size of the device and increase the cost.

The PTP packaging machine is, on the other hand, provided with a large number of devices configured to perform processing and inspection in various processes, as well as the X-ray inspection device, and accordingly has a small vacant space. When the X-ray inspection device has a large size, it is thus difficult to place the X-ray inspection device in the PTP packaging machine. On the contrary, there may be a need to increase the size of the PTP packaging machine for the purpose of placing the large-size X-ray inspection device therein.

The issues described above are not limited to PTP packaging but are likely to occur in the field of other packaging for packaging tablets, such as SP (strip package) packaging. These issues are also not limited to the case of using X-ray but are likely to occur in the case of using other electromagnetic waves that transmit through the packaging sheet, such as terahertz electromagnetic wave.

SUMMARY

By taking into account the circumstances described above, one or more embodiments provide an inspection device that allows for downsizing of the device, improves the inspection accuracy and the like as well as a packaging sheet manufacturing apparatus and a packaging sheet manufacturing method.

The following describes each of various aspects of the present disclosure. Functions and advantageous effects that are characteristic of each of the aspects are also described as appropriate.

Aspect 1. There is provided an inspection device used in a process of manufacturing a packaging film (for example, a PTP film) in a belt-like form by mounting a first film (for example, a container film) in a belt-like form made of an opaque material and a second film (for example, a cover film) in a belt-like form made of an opaque material to each other and placing a tablet in a space (for example, a pocket portion) formed between the first film and the second film; and manufacturing packaging sheets (for example, PTP sheets) by separating the packaging film at a plurality of positions in a film width direction of the packaging film into sheet units. The inspection device comprises a plurality of electromagnetic wave irradiation units (i.e., electromagnetic wave irradiators) configured to irradiate a plurality of inspection ranges, which are set corresponding to the packaging sheets at the plurality of positions in the film width direction of the packaging film conveyed in a belt-like form, with a predetermined electromagnetic wave (for example, X-ray) from a first film-side; an imaging unit (i.e., imaging device) placed on a second film-side such as to be opposed to the plurality of electromagnetic wave irradiation units across the packaging film; provided with an electromagnetic wave detection unit (i.e., electromagnetic wave detector; for example, a line sensor) that includes a plurality of detection elements configured to detect the electromagnetic wave transmitted through the packaging film and arrayed along the film width direction; and configured to successively output electromagnetic wave transmission image data obtained every time the packaging film is conveyed by a predetermined amount; and an image processing unit (i.e., controller) configured to perform an inspection with respect to the packaging sheet, based on the electromagnetic wave transmission image data obtained by the imaging unit.

With respect to a non-inspection range (inspection-free range) that is provided between a first inspection range on one side in the film width direction and a second inspection range on the other side in the film width direction, out of two inspection ranges adjacent to each other in the film width direction of the packaging film, a boundary between a first irradiation range that is irradiated with the electromagnetic wave from a first electromagnetic wave irradiation unit located on one side in the film width direction corresponding to the first inspection range and a second irradiation range that is irradiated with the electromagnetic wave from a second electromagnetic wave irradiation unit located on the other side in the film width direction corresponding to the second inspection range is set. The electromagnetic wave radiated from the first electromagnetic wave irradiation unit and transmitted through the first inspection range and the electromagnetic wave radiated from the second electromagnetic wave irradiation unit and transmitted through the second inspection range are arranged such as not to overlap with each other on the imaging unit.

The "packaging sheet" described above includes, for example, a "PTP sheet" and an "SP sheet". The same applies to the aspects described below.

The "inspection with respect to the packaging sheet" described above includes an "inspection for tablet", for example, the presence or the absence of a tablet in the space, breaking or crack of a tablet, an "inspection for flange portion", for example, the presence or the absence of any foreign substance in a flange portion formed around the space (part where the first film and the second film are mounted to each other), and the like.

The "non-inspection range (inspection-free range)" described above includes a range where the various inspections described above are not performed (a range that does not require the various inspections described above), for example, a range corresponding to a waste part (scrap) of the packaging film that is not used to form a product (packaging sheet) and a range corresponding to a tag portion included in a part of the packaging film that forms a product (packaging sheet).

When the above tag portion is set as the "non-inspection range" out of the range corresponding to the packaging sheet, a remaining range corresponding to a sheet main body excluding the tag portion is set as an "inspection range" with respect to the packaging sheet.

The "tag portion" herein indicates a location provided at one end in a predetermined direction of the packaging sheet to show various information, for example, the name of the tablet or the lot number by stamping, by printing or the like. Unlike the sheet main body where the space for placing the tablet therein is formed, no space is formed in the "tag portion". According to one configuration, a separation line such as a perforation may be formed on the boundary between the sheet main body and the tag portion to separate the tag portion from the sheet main body, and the sheet main body may be parted from the tag portion by this separation line. According to another configuration, no separation line may be formed between the sheet main body and the tag portion.

In the configuration of aspect 1, the arrangement of the plurality of electromagnetic wave irradiation units to be arrayed in the width direction of the packaging film keeps the irradiation range of the electromagnetic wave to a wide range in the width direction of the packaging film without increasing the irradiation angle (spread in the film width direction) of the electromagnetic wave radiated from each of the electromagnetic wave irradiation units compared with the conventional irradiation angle, while shortening the distance between each of the electromagnetic wave irradiation unit and the packaging film compared with the conventional distance. As a result, this arrangement allows for downsizing of the inspection device.

Furthermore, the shorter distance between each of the electromagnetic wave irradiation units and the packaging film ensures a sufficient transmission amount of electromagnetic wave required for the inspection and improves the inspection accuracy. Additionally, this arrangement allows for downsizing of the electromagnetic wave irradiation units and thereby allows for further downsizing of the inspection device.

Moreover, in the configuration of this aspect, the electromagnetic wave radiated from the first electromagnetic wave irradiation unit located on one side in the film width direction and transmitted through the packaging film and the electromagnetic wave radiated from the second electromagnetic wave irradiation unit located on the other side in the film width direction and transmitted through the packaging film are set not to overlap with each other on one imaging unit (electromagnetic wave detection unit).

As a result, this configuration enables an inspection for the first inspection range on one side in the film width direction to be performed without being affected by the electromagnetic wave radiated from the second electromagnetic wave irradiation unit located on the other side in the film width direction. This accordingly improves the inspection accuracy.

The following configurations may be employed as the configuration that causes the electromagnetic wave radiated from the first electromagnetic wave irradiation unit and transmitted through the packaging film and the electromagnetic wave radiated from the second electromagnetic wave irradiation unit and transmitted through the packaging film not to overlap with each other on the imaging unit (the electromagnetic wave detection unit).

In one example, in a device provided with a first inspection unit that includes a first electromagnetic wave irradiation unit located on one side in the film width direction and a first imaging unit provided on one side in the film width direction corresponding to the first electromagnetic wave irradiation unit and provided with a second inspection unit that includes a second electromagnetic wave irradiation unit located on the other side in the film width direction and a second imaging unit provided on the other side in the film width direction corresponding to the second electromagnetic wave irradiation unit, a configuration may arrange the first inspection unit and the second inspection unit to be shifted from each other in a conveying direction of the packaging film.

This configuration, however, expands the size of the device in the film conveying direction and is also likely to increase the total number of components and complicate the control. The configuration of the above aspect, on the other hand, performs an inspection based on image data taken by one imaging unit and thereby suppresses the occurrence of such issues.

In another example, in a device provided with a first electromagnetic wave irradiation unit located on one side in the film width direction, a second electromagnetic wave irradiation unit located on the other side in the film width direction, and one imaging unit opposed to both the electromagnetic wave irradiation units, a configuration may cause the respective electromagnetic wave irradiation units to alternately radiate the electromagnetic wave and cause the imaging unit to take an image of the alternately radiated electromagnetic wave.

This configuration, however, complicates the control and is also likely to reduce the inspection accuracy and decrease the film conveying rate (production rate). The configuration of the above aspect, on the other hand, performs an inspection by simultaneously radiating electromagnetic wave from the two electromagnetic wave irradiation units and taking an image of the electromagnetic wave by one imaging unit and thereby suppresses the occurrence of such issues.

In another example, a device may be provided with a shielding plate to shield the electromagnetic wave, with a view to allowing an inspection with respect to a first inspection range on one side in the film width direction to be performed without being affected by the electromagnetic wave radiated from the second electromagnetic wave irradiation unit located on the other side in the film width direction.

This configuration is, however, likely to expand the size of the device and increase the total number of components. The configuration of the above aspect, on the other hand, suppresses the occurrence of such issues.

Furthermore, in the configuration of the above aspect, the boundary between the first irradiation range that is irradiated with the electromagnetic wave from the first electromagnetic wave irradiation unit located on one side in the film width direction and the second irradiation range that is irradiated with the electromagnetic wave from the second electromagnetic wave irradiation unit located on the other side in the film width direction is set in the non-inspection range (the inspection-free range) provided between the first inspection range on one side in the film width direction and the second inspection range on the other side in the film width direction.

This configuration enables the entirety of the plurality of inspection ranges set in the width direction of the packaging film to be irradiated with the electromagnetic wave, even in the case where the electromagnetic wave radiated from the first electromagnetic wave irradiation unit located on one side in the film width direction and transmitted through the packaging film and the electromagnetic wave radiated from the second electromagnetic wave irradiation unit located on the other side in the film width direction and transmitted through the packaging film are set not to overlap with each other on one imaging unit.

Shortening the distance between the imaging unit and the packaging film narrows the width dimension of the non-inspection range (the inspection-free range). This also allows for downsizing of the packaging sheet manufacturing apparatus.

Aspect 2. There is provided an inspection device used in a process of manufacturing a packaging film (for example, a PTP film) in a belt-like form by mounting a first film (for example, a container film) in a belt-like form made of an opaque material and a second film (for example, a cover film) in a belt-like form made of an opaque material to each other and placing a tablet in a space (for example, a pocket portion) formed between the first film and the second film; and manufacturing packaging sheets (for example, PTP sheets) by separating the packaging film at a plurality of positions in a film width direction of the packaging film into sheet units. The inspection device comprises a plurality of electromagnetic wave irradiation units configured to irradiate a plurality of inspection ranges, which are set corresponding to the packaging sheets at the plurality of positions in the film width direction of the packaging film conveyed in a belt-like form, with a predetermined electromagnetic wave (for example, X-ray) from a first film-side; an imaging unit placed on a second film-side such as to be opposed to the plurality of electromagnetic wave irradiation units across the packaging film; provided with an electromagnetic wave detection unit (for example, a line sensor) that includes a plurality of detection elements configured to detect the electromagnetic wave transmitted through the packaging film and arrayed along the film width direction; and configured to successively output electromagnetic wave transmission image data obtained every time the packaging film is conveyed by a predetermined amount; and an image processing unit configured to perform an inspection with respect to the packaging sheet, based on the electromagnetic wave transmission image data obtained by the imaging unit.

With respect to a non-inspection range (inspection-free range) that is provided between a first inspection range on one side in the film width direction and a second inspection range on the other side in the film width direction, out of two inspection ranges adjacent to each other in the film width direction of the packaging film, an other-side end in the film width direction of a first irradiation range that is irradiated with the electromagnetic wave from a first electromagnetic wave irradiation unit located on one side in the film width direction corresponding to the first inspection range is set in a first boundary that is a boundary between the first inspection range and the non-inspection range, and a one-side end in the film width direction of a second irradiation range that is irradiated with the electromagnetic wave from a second electromagnetic wave irradiation unit located on the other side in the film width direction corresponding to the second inspection range is set in a second boundary that is a boundary between the second inspection range and the non-inspection range.

The first electromagnetic wave irradiation unit, the second electromagnetic wave irradiation unit, and the imaging unit are arranged to satisfy a relationship of Expression (α):

$$H1 \leq R/(\tan \phi 1 + \tan \phi 2) \tag{α}$$

where H1 denotes a distance between the packaging film and the imaging unit, φ1 denotes an incident angle of the electromagnetic wave that is radiated from the first electromagnetic wave irradiation unit, to the first boundary (an incident angle of the electromagnetic wave that is radiated from the first electromagnetic wave irradiation unit, passes through the first boundary and enters the electromagnetic wave detection unit), φ2 denotes an incident angle of the electromagnetic wave that is radiated from the second electromagnetic wave irradiation unit, to the second boundary (an incident angle of the electromagnetic wave that is radiated from the second electromagnetic wave irradiation unit, passes through the second boundary, and enters the electromagnetic wave detection unit), and R denotes a width of the non-inspection range in the film width direction.

The configuration of aspect 2 causes the electromagnetic wave radiated from the first electromagnetic wave irradiation unit and transmitted through the first inspection range and the electromagnetic wave radiated from the second electromagnetic wave irradiation unit and transmitted through the second inspection range not to overlap with each other on the imaging unit. As a result, this configuration has similar functions and advantageous effects to those of aspect 1 described above.

Aspect 3. In the inspection device described in either aspect 1 or aspect 2, the plurality of electromagnetic wave irradiation units may be arranged such that center axes (bisectors of the respective irradiation angles) of the respective electromagnetic wave irradiation units are parallel to a normal direction of the packaging film.

As described above, the intensity of the electromagnetic wave radially radiated from the electromagnetic wave irradiation unit attenuates in inverse proportion to the square of distance. A difference in the incident angle of electromagnetic wave to the packaging film causes a difference in the inspection capability. If the center axis of each electromagnetic wave irradiation unit is set to be inclined to the packaging film (the normal direction of the film), it may thus be difficult to irradiate an entire inspection range uniformly with electromagnetic wave.

The configuration of aspect 3, on the other hand, enables the entire inspection range to be uniformly irradiated with electromagnetic wave and thereby improves the inspection accuracy.

Aspect 4. In the inspection device described in any of aspects 1 to 3, the electromagnetic wave may be X-ray or terahertz electromagnetic wave.

Aspect 5. In the inspection device described in any of aspects 1 to 4, the first film and the second film may be made by using aluminum as a base material (main material).

The film "made by using aluminum as the base material (main material) includes not only a film made of simple aluminum but an aluminum laminated film with an intervening resin film layer.

Aspect 6. In the inspection device described in any of aspects 1 to 5, the non-inspection range may include a range corresponding to a tag portion of a first packaging sheet on one side in the film width direction and/or a range corresponding to a tag portion of a second packaging sheet on the other side in the film width direction, out of ranges corresponding to two packaging sheets that are adjacent to each other in the film width direction of the packaging film.

The configuration of aspect 6 allows the non-inspection range in the film width direction to be set to a wider range. As a result, this enhances the functions and the advantageous effects of the respective aspects described above.

Aspect 7. There is provided a packaging sheet manufacturing apparatus comprising the inspection device described in any of aspects 1 to 6.

The packaging sheet manufacturing apparatus provided with the inspection device like the configuration of aspect 7 has advantages, for example, efficiently excluding defectives in the process of manufacturing the packaging sheets. The packaging sheet manufacturing apparatus may be provided with a discharge unit configured to discharge any packaging sheet determined as defective by the inspection device described above.

The packaging sheet manufacturing apparatus may have a configuration described below as a concrete example.

There is provided a packaging sheet manufacturing apparatus configured to manufacture a packaging film in a belt-like form by mounting a first film in a belt-like form made of an opaque material and a second film in a belt-like form made of an opaque material to each other and placing a tablet in a space formed between the first film and the second film; and to manufacture packaging sheets by separating the packaging film at a plurality of positions in a film width direction of the packaging film into sheet units. The packaging sheet manufacturing apparatus comprises a mounting unit configured to mount the first film conveyed in a belt-like form and the second film conveyed in a belt-like form to each other; a filling unit configured to fill the tablet in the space formed between the first film and the second film; a separation unit configured to separate the packaging sheets from the packaging film formed by mounting the first film and the second film to each other and placing the tablet in the space (including a punchout unit configured to punch out the packaging film into sheet units); and the inspection device described in any of aspects 1 to 6.

The packaging sheet manufacturing apparatus is provided with a large number of devices configured to perform processing and inspection in various processes, as well as the inspection device described above, and accordingly has a small vacant space. When the inspection device has a large size, it is thus difficult to place the inspection device in the packaging sheet manufacturing apparatus. On the contrary, there may be a need to increase the size of the packaging sheet manufacturing apparatus for the purpose of placing the large-size inspection device therein.

Providing the inspection device described in any of aspects 1 to 6, however, suppresses the occurrence of such issues.

Aspect 8. There is provided a packaging sheet manufacturing method of manufacturing a packaging film (for example, a PTP film) in a belt-like form by mounting a first film (for example, a container film) in a belt-like form made of an opaque material and a second film (for example, a cover film) in a belt-like form made of an opaque material to each other and placing a tablet in a space (for example, a pocket portion) formed between the first film and the second film; and manufacturing packaging sheets (for example, PTP sheets) by separating the packaging film at a plurality of positions in a film width direction of the packaging film into sheet units. The packaging sheet manufacturing method comprises a mounting process of mounting the first film conveyed in a belt-like form and the second film conveyed in a belt-like form to each other; a filling process of filling the tablet in the space formed between the first film and the second film; a separation process of separating the packaging sheets from the packaging film formed by mounting the first film and the second film to each other and placing the tablet in the space (including a punchout process of punching out the packaging film into sheet units); and an inspection process of performing an inspection with respect to the packaging sheet.

The inspection process comprises an irradiation process of irradiating a plurality of inspection ranges, which are set corresponding to the packaging sheets at the plurality of positions in the film width direction of the packaging film conveyed in a belt-like form, with a predetermined electromagnetic wave (for example, X-ray) from predetermined electromagnetic wave irradiation units; an imaging process of using a predetermined imaging unit placed to be opposed to the electromagnetic wave irradiation units across the packaging film to detect the electromagnetic wave transmitted through the packaging film and outputting electromagnetic wave transmission image data obtained by the detection of the electromagnetic wave, every time the packaging film is conveyed by a predetermined amount; and a good/poor quality judgment process of performing good/poor quality judgment with respect to the packaging sheet, based on the electromagnetic wave transmission image data obtained by the imaging.

With respect to a non-inspection range (inspection-free range) that is provided between a first inspection range on one side in the film width direction and a second inspection range on the other side in the film width direction, out of two inspection ranges adjacent to each other in the film width direction of the packaging film, the packaging sheet manufacturing method sets a boundary between a first irradiation range that is irradiated with the electromagnetic wave from a first electromagnetic wave irradiation unit located on one side in the film width direction corresponding to the first inspection range and a second irradiation range that is irradiated with the electromagnetic wave from a second electromagnetic wave irradiation unit located on the other side in the film width direction corresponding to the second inspection range. The packaging sheet manufacturing method arranges the electromagnetic wave radiated from the first electromagnetic wave irradiation unit and transmitted through the first inspection range and the electromagnetic wave radiated from the second electromagnetic wave irradiation unit and transmitted through the second inspection range such as not to overlap with each other on the imaging unit.

The configuration of aspect 8 has similar functions and advantageous effects to those of aspect 7 described above.

DETAILED DESCRIPTION OF EMBODIMENTS

The following describes embodiments with reference to drawings. A PTP sheet 1 as packaging sheet (sheet-like package) is described first.

Figure 1:
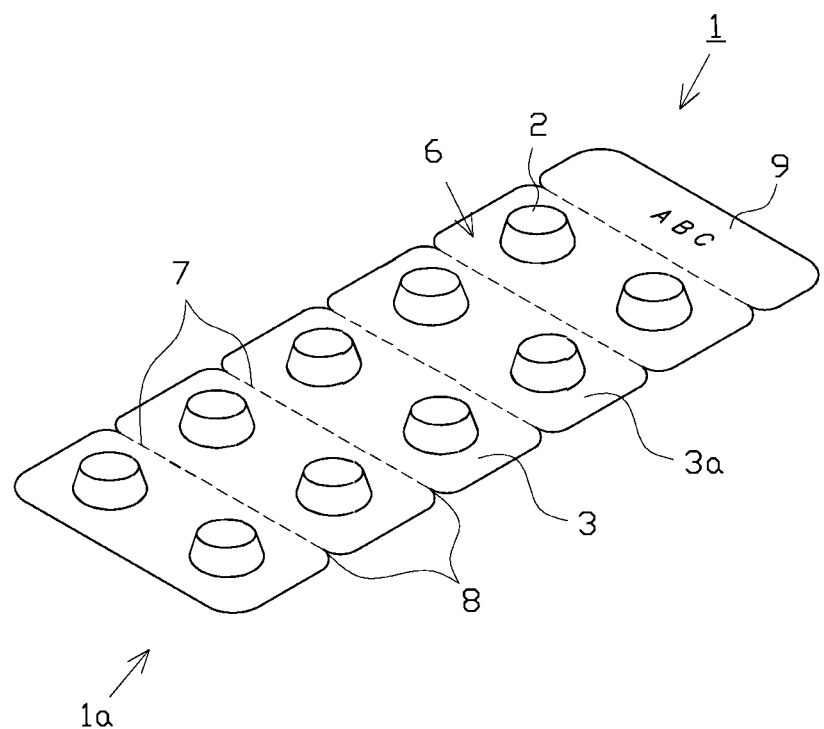
FIG. 1 is a perspective view illustrating a PTP sheet.
Figure 2:
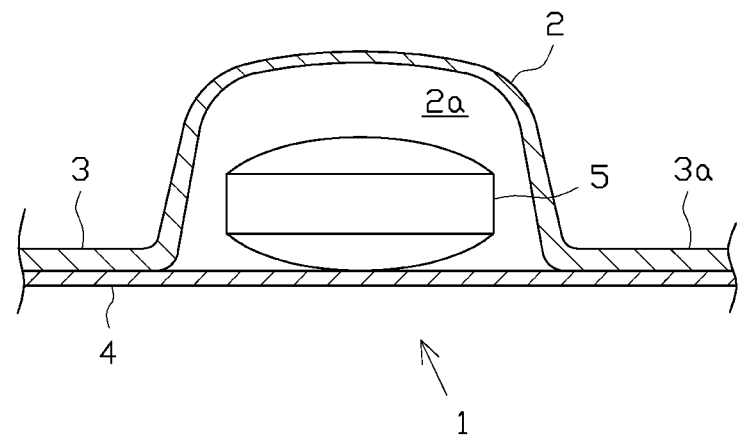
FIG. 2 is a partly enlarged sectional view illustrating the PTP sheet.

As shown in FIG. 1 and FIG. 2, the PTP sheet 1 includes a container film 3 provided with a plurality of pocket portions 2, and a cover film 4 mounted to the container film 3 such as to close the respective pocket portions 2. According to one or more embodiments, the "container film 3" is configured as the "first film", and the "cover film 4" is configured as the "second film".

The container film 3 and the cover film 4 according to one or more embodiments are composed of opaque materials that include aluminum as a base material (main material). For example, the container film 3 is made of an aluminum laminated film (an aluminum film with a synthetic resin film laminated thereon). The cover film 4 is, on the other hand, made of an aluminum film.

The PTP sheet 1 is formed in an approximately rectangular shape in plan view and has four corners in a rounded shape like an arc. In the PTP sheet 1, two pocket arrays are formed in a sheet short side direction, and each pocket array includes five pocket portions 2 arranged along a sheet longitudinal direction. Accordingly, a total of ten pocket portions 2 are formed in the PTP sheet 1. One tablet 5 is placed in each of spaces 2a inside the respective pocket portions 2.

The PTP sheet 1 also includes a plurality of perforations 7 formed along the sheet short side direction as separation lines that enable the PTP sheet 1 to be separated in the unit of small sheet pieces 6, each unit including a predetermined number of (two according to one or more embodiments) the pocket portions 2.

The PTP sheet 1 further includes constricted portions 8 formed corresponding to the positions where the perforations 7 are formed. This configuration causes four corners of each of the small sheet pieces 6 to have a rounded shape like an arc when the PTP sheet 1 is separated in the unit of the small sheet pieces 6.

The PTP sheet 1 additionally includes a tag portion 9 provided at one end in the sheet longitudinal direction to show various pieces of information such as the name of the tablet and a lot number (a letter string "ABC" according to one or more embodiments) stamped therein. The tag portion 9 is not provided with the pocket portions 2 but is parted from a sheet main body 1a consisting of the five small sheet pieces 6 by one perforation 7.

The PTP sheet 1 of one or more embodiments (shown in FIG. 1) is manufactured through, for example, a process of punching out a rectangular sheet that is the PTP sheet 1 as a final product from a belt-like PTP film 25 (shown in FIG. 3) obtained by mounting a belt-like cover film 4 to a belt-like container film 3. In the description below, a "width direction of the PTP film 25 (a vertical direction in FIG. 3)" is referred to as "film width direction", and a "conveying direction of the PTP film 25 (a horizontal direction in FIG. 3)" is referred to as "film conveying direction".

Figure 3:
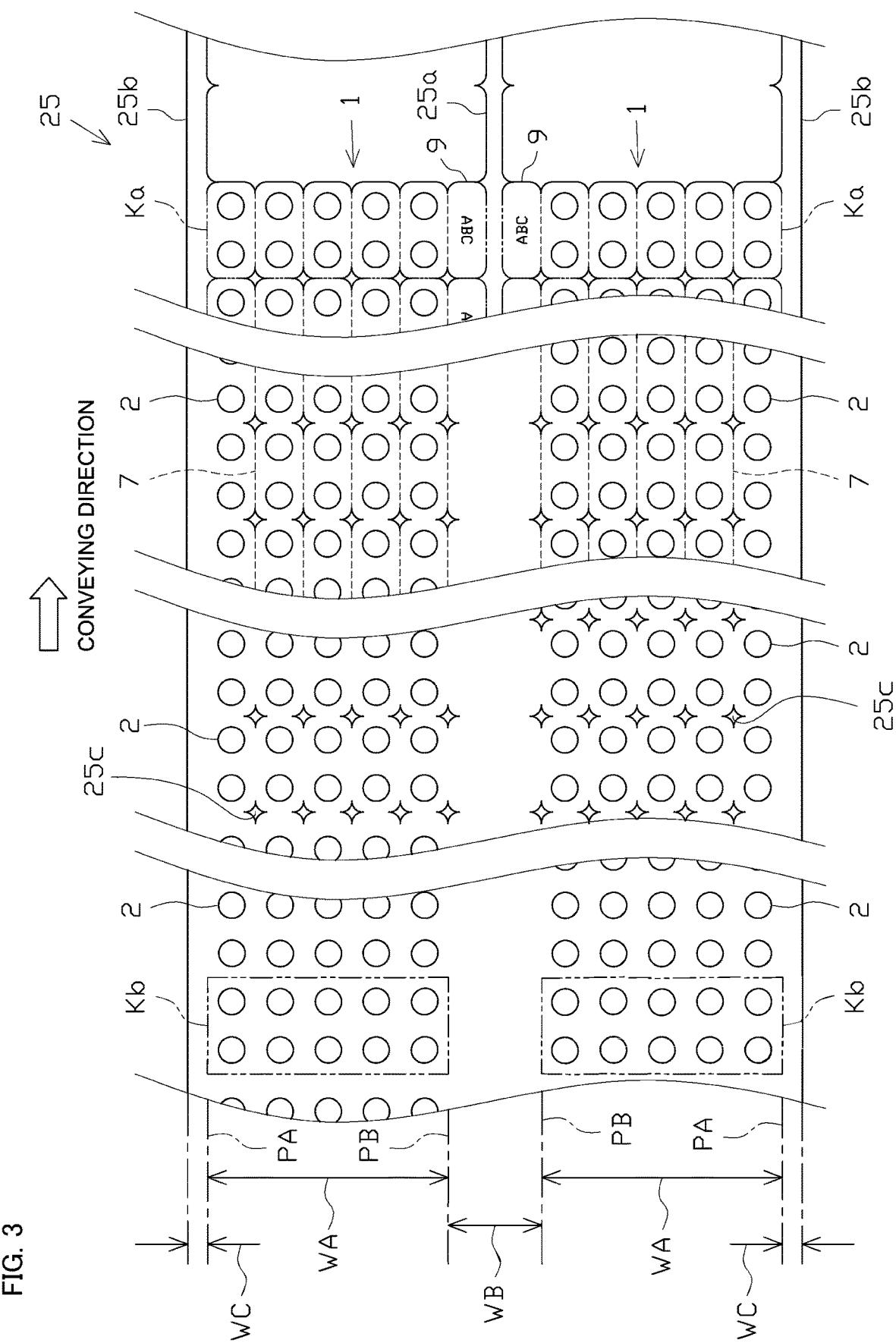
FIG. 3 is a schematic configuration diagram illustrating a layout of a PTP film.

As shown in FIG. 3, the PTP film 25 according to one or more embodiments is configured in such a layout that two punch-out ranges Ka for the PTP sheets 1 (hereinafter simply referred to as "sheet punch-out ranges Ka") are arrayed in the film width direction, that a central scrap 25a extended in a belt-like form along the film conveying direction connects the two sheet punch-out ranges Ka arrayed to be adjacent to each other, that side scraps 25b extended in a belt-like form along the film conveying direction connect respective ends in the film width direction, and a plurality of astroid scraps 25c are arranged on boundary lines between the two sheet punch-out ranges Ka adjacent to each other in the film conveying direction to form the constricted portions 8 described above. In FIG. 3, for the purpose of simplifying the illustration and making the astroid scraps 25c readily understandable, holes formed by punching out the astroid scraps 25c are indicated as the astroid scraps 25c with lead lines.

The PTP sheets 1 punched out from the two sheet punch-out ranges Ka arrayed in the film width direction have the tag portions 9 that respectively face a central area in the film width direction and that are adjacent to the central scrap 25a.

The following describes the schematic configuration of a PTP packaging machine 10 as the packaging sheet manufacturing apparatus configured to manufacture the PTP sheet described above, with reference to FIG. 4.

Figure 4:
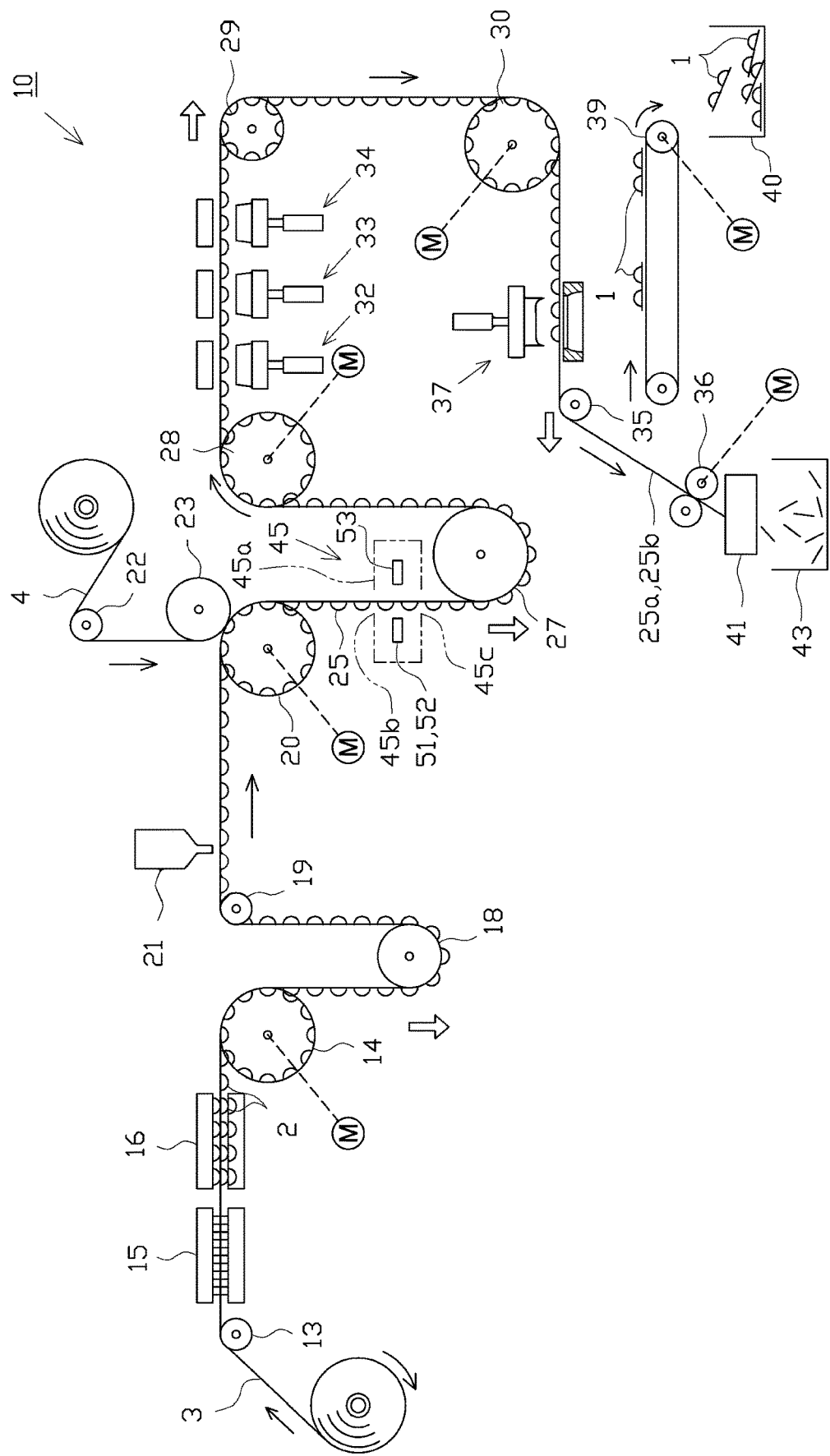
FIG. 4 is a schematic configuration diagram illustrating a PTP packaging machine.

As shown in FIG. 4, a film roll of the belt-like container film 3 is wound in a roll form on a most upstream side of the PTP packaging machine 10. A pullout end of the container film 3 wound in the roll form is guided by a guide roll 13. The container film 3 is then laid on an intermittent feed roll 14 provided on a downstream side of the guide roll 13. The intermittent feed roll 14 is linked with a motor rotating in an intermittent manner, so as to convey the container film 3 intermittently.

A pocket portion forming device 16 serving as the pocket portion forming unit is placed along the conveyance path of the container film 3 between the guide roll 13 and the intermittent feed roll 14. This pocket portion forming device 16 forms a plurality of the pocket portions 2 simultaneously at predetermined positions in the container film 3 by cold working (pocket portion forming process). Formation of the pocket portions 2 is performed during an interval between conveying operations of the container film 3 by the intermittent feed roll 14.

The PTP packaging machine 10 according to one or more embodiments is a packaging machine (multi-use machine) configured to use not only aluminum but a thermoplastic resin material that is relatively hard and that has a predetermined rigidity, such as PP (polypropylene) or PVC (polyvinyl chloride), to manufacture the container film 3. Accordingly, the PTP packaging machine 10 is provided with a heating device 15 placed on an upstream side of the pocket portion forming device 16 to heat the container film 3 and make the container film 3 soft. The heating device 15 is naturally not used when the container film 3 is formed from aluminum.

The container film 3 fed from the intermittent feed roll 14 is sequentially laid on a tension roll 18, a guide roll 19 and a film receiving roll 20 in this order. The film receiving roll 20 is linked with a motor rotating at a fixed speed, so as to continuously convey the container film 3 at a fixed speed. The tension roll 18 is configured to pull the container film 3 in a direction of applying tension by an elastic force. This configuration prevents a slack of the container film 3 due to a difference between the conveying operation by the intermittent feed roll 14 and the conveying operation by the film receiving roll 20 and constantly keeps the container film 3 in the state of tension.

A tablet filling device 21 serving as the filling unit is placed along the conveyance path of the container film 3 between the guide roll 19 and the film receiving roll 20.

The tablet filling device 21 serves to automatically fill the pocket portions 2 with the tablets 5. The tablet filling device 21 opens a shutter at every predetermined time interval to drop the tablet 5, in synchronization with the conveying operation of the container film 3 by the film receiving roll 20. Each of the pocket portions 2 is filled with the tablet 5 by this shutter opening operation (filling process).

A film roll of the cover film 4 formed in the belt-like shape is also wound in a roll form on a most upstream side. A pullout end of the cover film 4 wound in the roll form is guided by a guide roll 22 to a heating roll 23. The heating roll 23 is pressed against to be in contact with the film receiving roll 20. The container film 3 and the cover film 4 are accordingly fed into between the two rolls 20 and 23.

The container film 3 and the cover film 4 pass through between the two rolls 20 and 23 in the heated and pressed contact state, so that the cover film 4 is mounted to a flange portion 3a (shown in FIGS. 1 and 2) around the pocket portions 2 of the container film 3 such as to close the respective pocket portions 2 with the cover film 4 (mounting process).

This series of operations manufactures the PTP film 25 that is a packaging film (belt-like package) having the pocket portions 2 respectively filled with the tablets 5. The heating roll 23 has minute protrusions formed on the surface of the heating roll 23 in a net-like pattern for sealing. Strongly pressing these protrusions against the films provides secure sealing. The film receiving roll 20 and the heating roll 23 are configured as the mounting unit according to one or more embodiments.

The film receiving roll 20 is provided with a non-illustrated encoder configured to output a predetermined timing signal to an X-ray inspection device 45 described later every time the film receiving roll 20 is rotated by a predetermined amount or in other words, every time the PTP film 25 is conveyed by a predetermined amount.

The PTP film 25 fed from the film receiving roll 20 is sequentially laid on a tension roll 27 and an intermittent feed roll 28 in this order.

The intermittent feed roll 28 is linked with a motor rotating in an intermittent manner, so as to convey the PTP film 25 intermittently. The tension roll 27 is configured to pull the PTP film 25 in a direction of applying tension by an elastic force. This configuration prevents a slack of the PTP film 25 due to a difference between the conveying operation by the film receiving roll 20 and the conveying operation by the intermittent feed roll 28 and constantly keeps the PTP film 25 in the state of tension.

The X-ray inspection device 45 is placed along the conveyance path of the PTP film 25 between the film receiving roll 20 and the tension roll 27. The X-ray inspection device 45 is configured to perform X-ray inspection mainly for the purpose of detection of any abnormality of the tablet 5 (for example, the presence or the absence of the tablet 5, breaking or crack of the tablet 5) placed in the pocket portion 2 or any abnormality of the flange portion 3*a* (for example, any foreign substance present on the flange 3*a*) other than the pocket portions 2.

The PTP film 25 fed from the intermittent feed roll 28 is sequentially laid on a tension roll 29 and an intermittent feed roll 30 in this order. The intermittent feed roll 30 is linked with a motor rotating in an intermittent manner, so as to convey the PTP film 25 intermittently. The tension roll 29 is configured to pull the PTP film 25 in a direction of applying tension by an elastic force and thereby serves to prevent a slack of the PTP film 25 between these intermittent feed rolls 28 and 30.

A scrap punching device 32, a perforation forming device 33, and a stamping device 34 are sequentially placed along the conveyance path of the PTP film 25 between the intermittent feed roll 28 and the tension roll 29.

The scrap punching device 32 serves to punch out the astroid scraps 25*c* described above from predetermined positions of the PTP film 25. The perforation forming device 33 serves to form the perforations 7 described above at predetermined positions of the PTP film 25. The stamping device 34 serves to stamp the mark "ABC" described above at predetermined positions of the PTP film 25 (positions corresponding to the tag portions 9 described above).

The PTP film 25 fed from the intermittent feed roll 30 is sequentially laid on a tension roll 35 and a continuous feed roll 36 in this order, downstream of the intermittent feed roll 30. A sheet punching device 37 is placed along the conveyance path of the PTP film 25 between the intermittent feed roll 30 and the tension roll 35. The sheet punching device 37 serves as the sheet punchout unit (separation unit) to punch out the outer periphery of each unit of PTP sheet 1 from the PTP film 25.

The respective PTP sheets 1 punched out by the sheet punching device 37 are conveyed by a conveyor 39 and are temporarily accumulated in a finished product hopper 40 (separation process). When a PTP sheet 1 is determined as a defective by the X-ray inspection device 45 described above, however, the PTP sheet 1 determined as the defective is not conveyed to the finished product hopper 40 but is separately discharged by a non-illustrated defective sheet discharge mechanism serving as the discharge unit and is transferred to a non-illustrated defective hopper.

A cutting device 41 is provided downstream of the continuous feed roll 36. Wastes (scraps 25*a* and 25*b*) remaining in a belt-like form after the punch-out by the sheet punching device 37 are guided by the tension roll 35 and the continuous feed roll 36 and are then led to the cutting device 41. A driven roll is pressed against to be in contact with the continuous feed roll 36, so that the scraps 25*a* and 25*b* are placed and conveyed between the driven roll and the continuous feed roll 36.

The cutting device 41 serves to cut the scraps 25*a* and 25*b* into predetermined dimensions. The cut pieces of the scraps 25*a* and 25*b* are accumulated in a scrap hopper 43 and are then disposed separately.

Each of the rolls, such as the rolls 14, 19, 20, 28, 29 and 30, described above is arranged in such a positional relationship that the roll surface is opposed to the pocket portions 2. The surface of each roll, such as the surface of the roll 14, has recesses that are formed to place the pocket portions 2 therein. This configuration suppresses the pocket portions 2 from being crushed. The feeding operation with the pocket portions 2 placed in the respective recesses of each roll, such as the roll 14, achieves the reliable intermittent feed and continuous feed.

Figure 5:
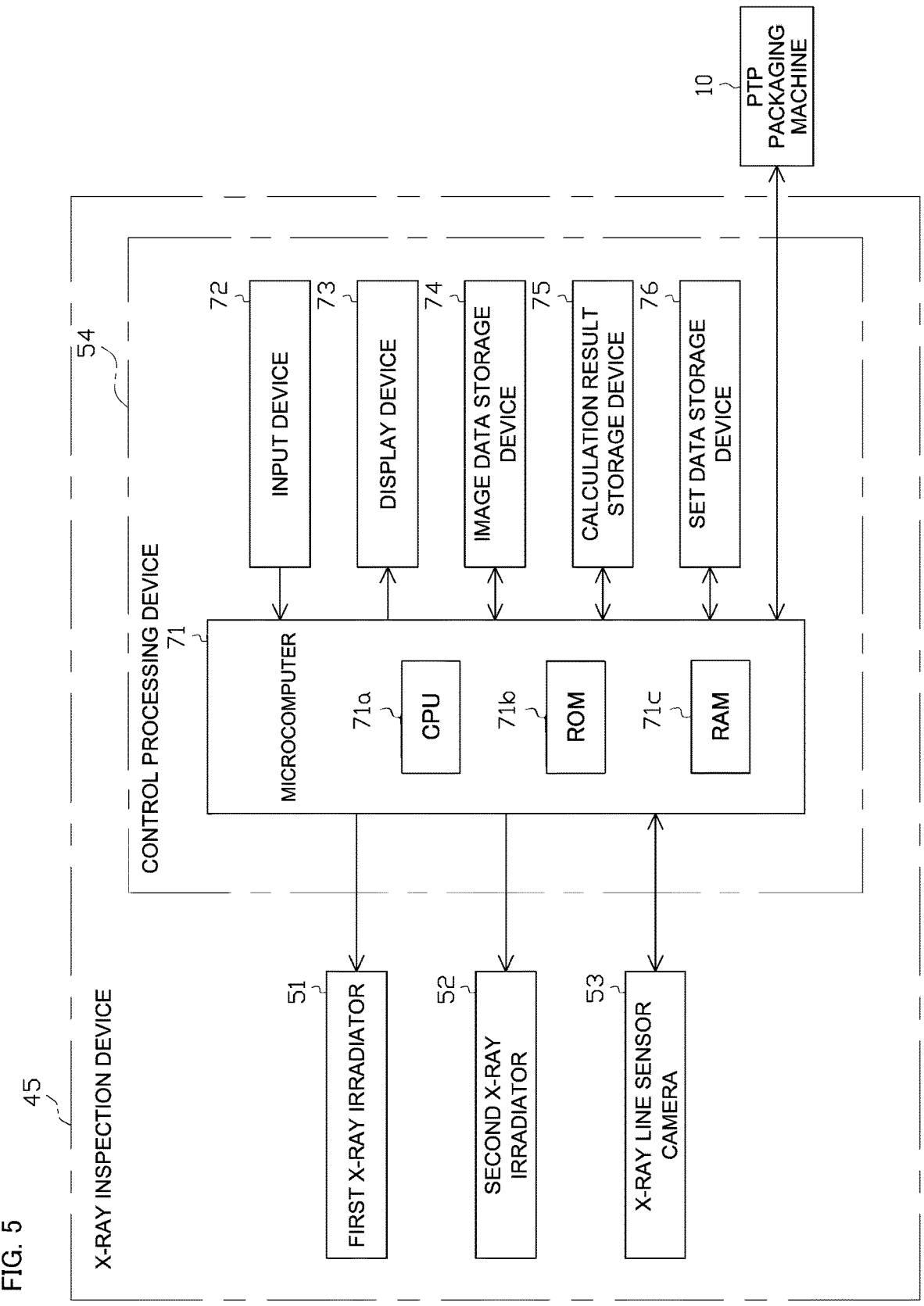
FIG. 5 is a block diagram illustrating the electrical configuration of an X-ray inspection device.
Figure 6:
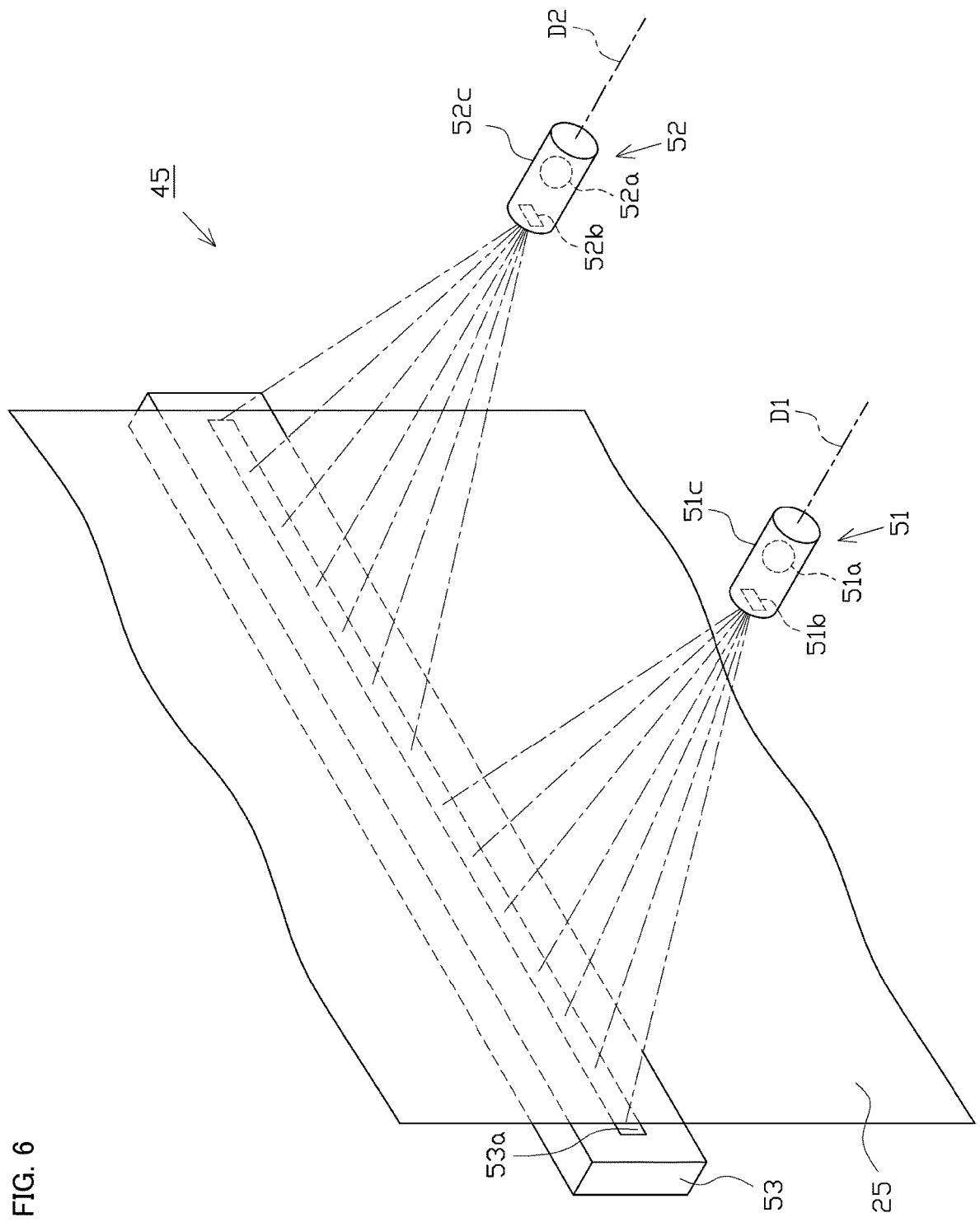
FIG. 6 is a perspective view schematically illustrating the general configuration of the X-ray inspection device.

The foregoing describes the outline of the PTP packaging machine 10. The following describes the configuration of the above X-ray inspection device 45 in detail with reference to drawings. FIG. 5 is a block diagram illustrating the electrical configuration of the X-ray inspection device 45. FIG. 6 is a perspective view schematically illustrating the schematic configuration of the X-ray inspection device 45. For the purpose of simplicity, part of the configuration, for example, the pocket portions 2 of the PTP film 25, is omitted from the illustration of FIG. 6.

As shown in FIGS. 5 and 6, the X-ray inspection device 45 includes two X-ray irradiators 51 and 52 (a first X-ray irradiator 51 and a second X-ray irradiator 52) configured to irradiate the PTP film 25 with X-ray; an X-ray line sensor camera 53 configured to take an X-ray transmission image of the PTP film 25 irradiated with the X-ray; and a control processing device 54 configured to perform various controls in the X-ray inspection device 45, such as drive controls of the X-ray irradiators 51 and 52 and the X-ray line sensor camera 53, image processing, arithmetic operations and the like.

According to one or more embodiments, the "X ray" corresponds to the "electromagnetic wave". Accordingly, the "X-ray transmission image (data)" configures the "electromagnetic wave transmission image (data)", the "control processing device 54" configures the "image processing unit" or "controller", the "X-ray irradiators 51 and 52 (the first X-ray irradiator 51 and the second X-ray irradiator 52)" configure the "electromagnetic wave irradiation units (the first electromagnetic wave irradiation unit and the second electromagnetic wave irradiation unit)", and the "X-ray line sensor camera 53" configures the "imaging unit".

The X-ray irradiators 51 and 52 and the X-ray line sensor camera 53 are placed in a shield box 45*a* made of a material that is capable of shielding the X-ray (as shown in FIG. 4). The shield box 45*a* is provided with a slit-like inlet 45*b*, a slit-like outlet 45*c* and the like to allow the PTP film 25 to pass through and otherwise has a structure that minimizes leakage of the X-ray to the outside.

Both the first X-ray irradiator 51 and the second X-ray irradiator 52 are arranged on an identical side in a normal direction of the PTP film 25 (on the container film 3-side according to one or more embodiments) that is conveyed with facing downward in the vertical direction. In the description below, the "normal direction of the PTP film 25" is referred to as the "film normal direction".

The first X-ray irradiator 51 and the second X-ray irradiator 52 are arranged at an identical position in the film conveying direction (at an identical height position), such as to be arrayed in the film width direction.

Each of the X-ray irradiators 51 and 52 includes an X-ray source 51*a* or 52*a* configured to emit X-ray; and a collimator 51*b* or 52*b* configured to concentrate the X-ray emitted from the X-ray source 51*a* or 52*a*, and is configured such that these components are placed in a shielding container 51*c* or 52*c* made of a material that is capable of shielding the X-ray. The X-ray emitted from the X-ray source 51*a* or 52*a* is radiated outside via an opening (not shown) provided in the shielding container 51*c* or 52*c*.

The X-ray irradiators 51 and 52 are known in the art, so that the detailed description of the respective components such as the X-ray sources 51*a* and 52*a* is omitted. For example, the X-ray sources 51*a* and 52*a* are configured to cause electrons accelerated by a high voltage to hit against an anodic target and thereby cause X-ray to radiate in a cone shape having the target as an apex.

Under such configuration, the X-ray irradiator 51 or 52 is configured to irradiate the PTP film 25 with X-ray in a fan beam shape having a predetermined spread in the film width direction (fan angle) by causing the collimator 51b or 52b to minimize a spread of the X-ray, which is radiated in the cone shape from the X-ray source 51a or 52a, in the film conveying direction (cone angle). The X-ray irradiator 51 or 52 may also be configured to further irradiate the PTP film 25 with X-ray in a cone beam shape having a predetermined spread in the film conveying direction.

The X-ray irradiator 51 or 52 is arranged such that its own center axis D1 or D2 (a bisector of the fan angle) is made parallel to the film normal direction of the PTP film 25.

The X-ray line sensor camera 53 is placed on an opposite side to the X-ray irradiators 51 and 52 (on the cover film 4-side according to one or more embodiments) across the PTP film 25, such as to be opposed to the respective X-ray irradiators 51 and 52 in the film normal direction.

The X-ray line sensor camera 53 includes an X-ray line sensor (i.e., X-ray detector) 53a configured by arraying a plurality of X-ray detection elements, which are capable of detecting the X-ray transmitted through the PTP film 25, in a line along the film width direction to serve as the electromagnetic wave detection unit, and is configured to take an image of (to be exposed to) the X-ray transmitted through the PTP film 25. The X-ray detection element may be, for example, a CCD (charge coupled device) having a light conversion layer by a scintillator.

X-ray transmission image data as electromagnetic wave transmission image data obtained by the X-ray line sensor camera 53 is converted into a digital signal (image signal) inside of the camera 53 and is successively output in the form of the digital signal to the control processing device 54 (image data storage device 74), every time the PTP film 25 is conveyed by a predetermined amount. The control processing device 54 then performs various inspections described later, for example, by performing image processing of the X-ray transmission image data.

Figure 7:
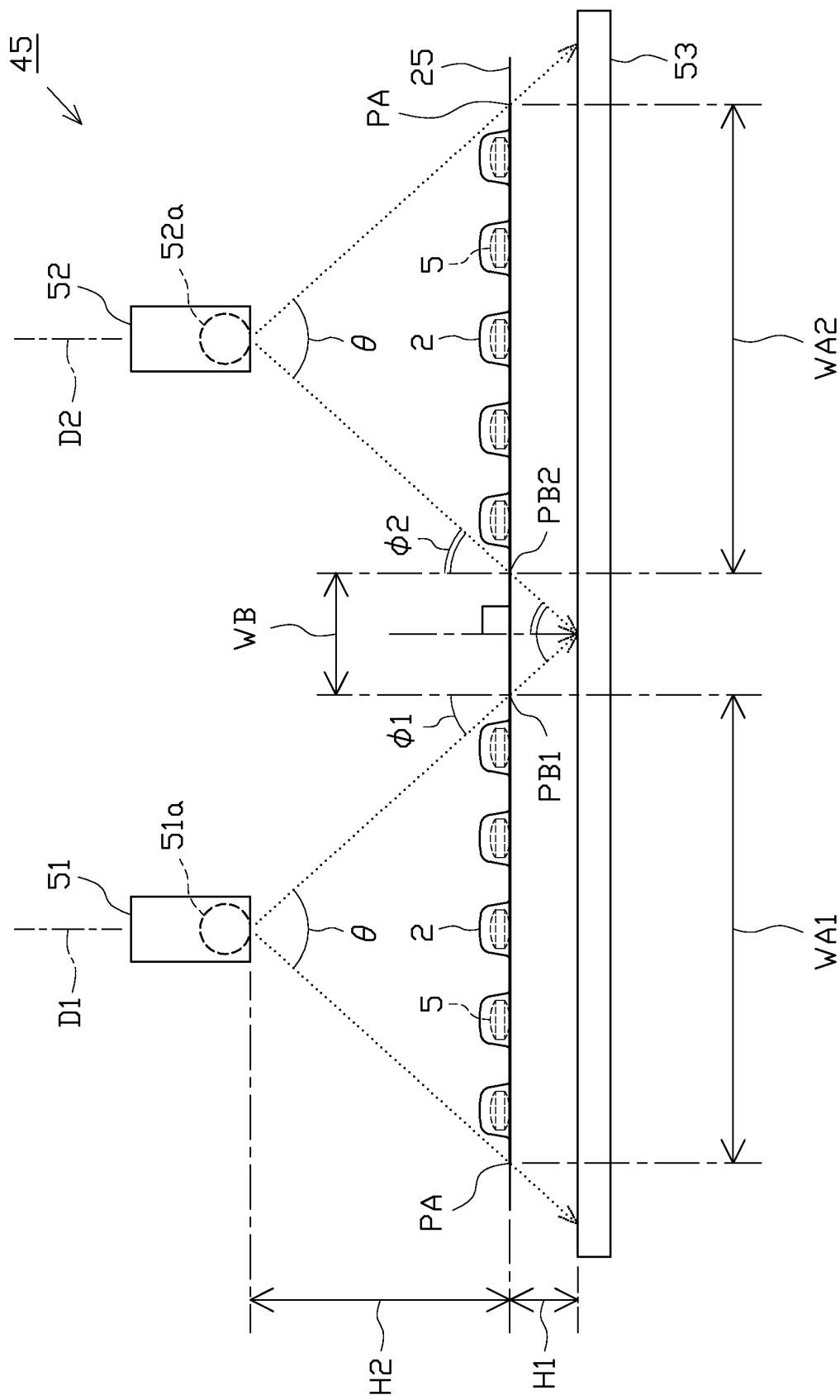
FIG. 7 is a schematic diagram illustrating a positional relationship between a first X-ray irradiator, a second X-ray irradiator, an X-ray line sensor camera, and a PTP film.

A positional relationship between the X-ray irradiators 51 and 52, the X-ray line sensor camera 53 and the PTP film 25 is described in detail with reference to FIGS. 3 and 7. The following first describes an "inspection area" on the PTP film 25 that is subjected to an inspection by the X-ray inspection device 45 and a "non-inspection area (inspection-free area)" that is not subjected to the inspection.

According to one or more embodiments, in an area corresponding to the PTP sheet 1 (sheet punchout range Ka), an area corresponding to the sheet main body 1a that consists of the five small sheet pieces 6 excluding an area corresponding to the tag portion 9 is set as an inspection area Kb with respect to one PTP sheet 1.

According to one or more embodiments, out of two inspection areas Kb adjacent to each other in the film width direction, an inspection area Kb corresponding to the first X-ray irradiator 51 is equivalent to the "first inspection area", and an inspection area Kb corresponding to the second X-ray irradiator 52 is equivalent to the "second inspection area".

Accordingly, a film width direction predetermined range WA corresponding to the inspection area Kb described above (the sheet main body 1a of the PTP sheet 1) in the PTP film 25, or more specifically, the film width direction predetermined range WA from an outer-side boundary PA that is a boundary between the side scrap 25b and an area corresponding to the PTP sheet 1 adjacent to the side scrap 25b to a center-side boundary PB that is a boundary between an area corresponding to the tag portion 9 and an area corresponding to the small sheet piece 6 adjacent to this area indicates a film width direction inspection range (hereinafter simply referred to as "inspection range") and a film width direction X-ray irradiation range (hereinafter simply referred to as "X-ray irradiation range").

In other words, in the PTP film 25, an area corresponding to the center scrap 25a and the two tag portions 9 adjacent to the center scrap 25a and areas corresponding to the side scraps 25b are "non-inspection areas (inspection-free areas)".

Accordingly, in the PTP film 25, a center-portion predetermined range WB in the film width direction including the area corresponding to the center scrap 25a and the two tag portions 9 adjacent to the center scrap 25a and side-portion predetermined ranges WC in the film width direction corresponding to the side scraps 25b are "non-inspection ranges (inspection-free ranges)".

In the description below, when there is a need to distinguish the two inspection ranges (X-ray irradiation ranges) WA that are adjacent to each other in the film width direction, from each other, out of these two inspection ranges (X-ray irradiation ranges) WA, an inspection range (X-ray irradiation range) WA corresponding to the first X-ray irradiator 51 is referred to as a "first inspection range (first X-ray irradiation range) WA1", and an inspection range (X-ray irradiation range) WA corresponding to the second X-ray irradiator 52 is referred to as a "second inspection range (second X-ray irradiation range) WA2".

Similarly, when there is a need to distinguish the two center-side boundaries PB that are adjacent to each other in the film width direction, from each other, out of these two center-side boundaries PB, a center-side boundary PB that is the boundary between the first inspection range (first X-ray irradiation range) WA1 and the center-portion predetermined range WB is referred to as a "first boundary PB1", and a center-side boundary PB that is the boundary between the second inspection range (second X-ray irradiation range) WA2 and the center-portion predetermined range WB is referred to as a "second boundary PB2".

Under such configuration, the X-ray line sensor camera 53 is arranged with a predetermined distance H1 away from the PTP film 25 in the film normal direction, and the X-ray irradiators 51 and 52 (the X-ray sources 51a and 52a) are arranged with a predetermined distance H2 away from the PTP film 25 in the film normal direction. Furthermore, an irradiation angle (fan angle) of the X-ray radiated from the X-ray irradiators 51 and 52 (the X-ray sources 51a and 52a) is set to a predetermined angle θ.

According to one or more embodiments, the position of the center axis D1 of the first X-ray irradiator 51 in the film width direction is set at a center position of the first inspection range WA1 in the film width direction. Similarly, the position of the center axis D2 of the second X-ray irradiator 52 in the film width direction is set at a center position of the second inspection range WA2 in the film width direction.

When an incident angle of the X-ray from the first X-ray irradiator 51 (the X-ray source 51a) to the first boundary PB1 that is the boundary between the first inspection range WA1 and the center-portion predetermined range WB as the non-inspection range is "φ1" and an incident angle of the X-ray from the second X-ray irradiator 52 (the X-ray source 52a) to the second boundary PB2 that is the boundary between the second inspection range WA2 and the center-portion predetermined range WB as the non-inspection range is "φ2", the first X-ray irradiator 51, the second X-ray irradiator 52, and the X-ray line sensor camera 53 are arranged to satisfy a relationship expressed by Expression (α) given below:

$$H1 \leq R/(\tan \phi1 + \tan \phi2) \quad (\alpha)$$

where R denotes a width of the non-inspection range (center-portion predetermined range) WB in the film width direction.

One or more embodiments are configured such that the X-ray radiated from the first X-ray irradiator 51 and transmitted through the first boundary PB1 intersects with the X-ray radiated from the second X-ray irradiator 52 and transmitted through the second boundary PB2 at a center position in the film width direction of the non-inspection range (center-portion predetermined range) WB on the X-ray line sensor camera 53.

The following describes the control processing device 54 with reference to FIG. 5. The control processing device 54 includes a microcomputer 71 that is configured to control the entire X-ray inspection device 45, an input device 72 that is configured as the "input unit" by a keyboard and a mouse, a touch panel or the like, a display device 73 that is configured as the "display unit" having a display screen such as a CRT or a liquid crystal screen, an image data storage device 74 that is configured to store various image data and the like, a calculation result storage device 75 that is configured to store results of various arithmetic operations and the like, and a set data storage device 76 that is configured to store various pieces of information in advance. These devices 72 to 76 are electrically connected with the microcomputer 71.

The microcomputer 71 includes, for example, a CPU 71*a* serving as the operation unit, a ROM 71*b* configured to store various programs, and a RAM 71*c* configured to temporarily store a variety of data, for example, operation data and input/output data. The microcomputer 71 is configured to perform various controls in the control processing device 54 and is connected to send and receive various signals to and from the PTP packaging machine 10. The microcomputer 71 configures the image processing unit according to one or more embodiments.

Under such configuration, the microcomputer 71 drives and controls, for example, the X-ray irradiators 51 and 52 and the X-ray line sensor camera 53 to perform, for example, an imaging process of taking X-ray transmission image data with respect to the PTP film 25, an inspection process of inspecting the PTP sheet 1 based on the X-ray transmission image data, and an output process of outputting an inspection result of the inspection process to the defective sheet discharge mechanism of the PTP packaging machine 10 or the like.

The image data storage device 74 is configured to store various image data, such as the X-ray transmission image data obtained by the X-ray line sensor camera 53, as well as binarized image data obtained by a binarization process during an inspection and masking image data obtained by a masking process.

The calculation result storage device 75 is configured to store inspection result data and statistical data obtained by statistically processing the inspection result data. These inspection result data and statistical data may be displayed appropriately on the display device 73.

The set data storage device 76 is configured to store various pieces of information used for inspection. These various pieces of information set and stored include, for example, the shapes and the dimensions of the PTP sheet 1, the pocket portion 2, and the tablet 5, the shape and the dimensions of a sheet frame used to define the inspection area Kb described above, the shape and the dimensions of a pocket frame used to define the area of the pocket portion 2, a luminance threshold value in the binarization process, and judgment criterion values used in various good/poor quality judgments.

The following describes an X-ray inspection process performed by the X-ray inspection device 45. The flow of a process of obtaining the X-ray transmission image data is first described in detail.

The continuously conveyed PTP film 25 is carried into the X-ray inspection device 45 via the inlet 45*b* of the shield box 45*a* and is carried out of the X-ray inspection device 45 via the outlet 45*c*.

In the meantime, the microcomputer 71 drives and controls the X-ray irradiators 51 and 52 and the X-ray line sensor camera 53 to irradiate the continuously conveyed PTP film 25 with X-ray (irradiation process) and to image the X-ray transmitted through the PTP film 25 and take one-dimensional X-ray transmission image data (imaging process) every time the PTP film 25 is conveyed by a predetermined amount.

The X-ray transmission image data obtained in this manner by the X-ray line sensor camera 53 is converted into a digital signal inside of the camera 53 and is output in the form of the digital signal to the control processing device 54 (the image data storage device 74).

More specifically, when a timing signal is input from the encoder described above in the state that the PTP film 25 is continuously irradiated with the X-ray from the X-ray irradiators 51 and 52, the microcomputer 71 starts an exposure process by the X-ray line sensor camera 53.

In response to input of a next timing signal, the microcomputer 71 collectively transfers electric charges accumulated in a light receiving portion such as a photo diode to a shift register. The electric charges transferred to the shift register are then sequentially output as image signals (X-ray transmission image data) in response to a transfer clock signal, before input of a next timing signal.

Accordingly, a time period from input of a predetermined timing signal from the above encoder to input of a next timing signal is an exposure time in the X-ray line sensor camera 53.

One or more embodiments are configured such that the X-ray transmission image data is obtained by the X-ray line sensor camera 53 every time the PTP film 25 is conveyed by a width of the X-ray line sensor 53*a* in the film conveying direction, i.e., by a length corresponding to the width of one CCD. Another configuration different from this configuration may, however, be employed.

The image data storage device 74 sequentially stores the X-ray transmission image data input from the X-ray line sensor camera 53 in time series.

Every time the PTP film 25 is conveyed by a predetermined amount, the series of processing described above is repeatedly performed, and the position irradiated with X-ray is relatively moved. The X-ray transmission image data with respect to the two inspection ranges WA (the first inspection range WA1 and the second inspection range WA2) in the PTP film 25 are sequentially stored in time series with position information in the film conveying direction and in the film width direction, into the image data storage device 74. This causes the two-dimensional X-ray transmission image data with respect to the sheet main body 1*a* (the inspection area Kb) of the PTP sheet 1 to be sequentially generated.

When the X-ray transmission image data with respect to the sheet main body 1a (the inspection area Kb) of one PTP sheet 1 as a product is obtained in this manner, the microcomputer 71 performs an inspection process (inspection routine).

Figure 8:
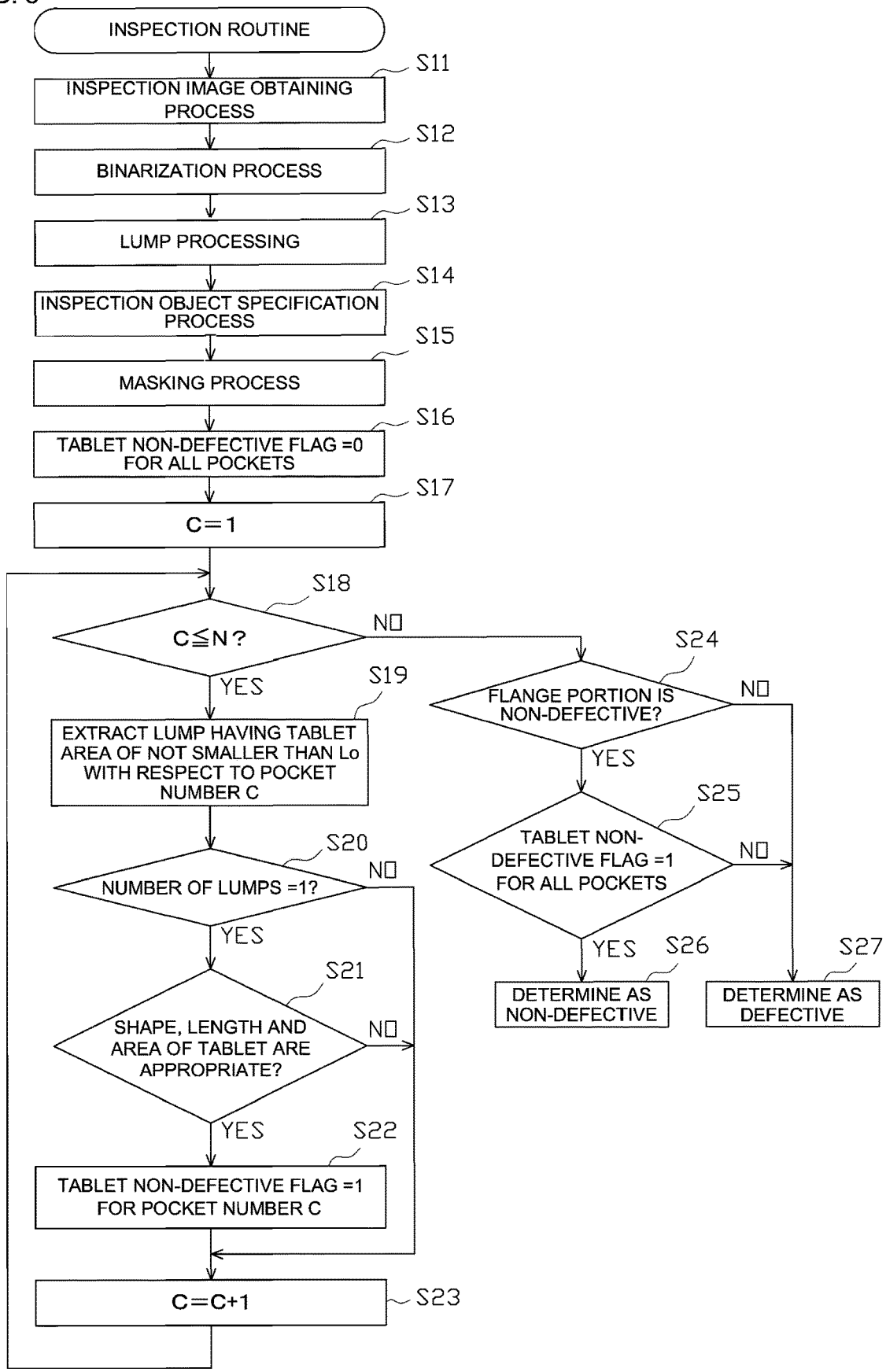
FIG. 8 is a flowchart showing an inspection routine.

The following describes the inspection routine (good/poor quality judgment process) performed by the microcomputer 71 in detail with reference to the flowchart of FIG. 8.

The inspection routine shown in FIG. 8 is performed with respect to the sheet main body 1a (the inspection area Kb) of each PTP sheet 1 as the product. More specifically, the inspection routine shown in FIG. 8 is performed for X-ray transmission image data with respect to the two PTP sheets (the sheet main bodies 1a) obtained from the two inspection ranges WA (the first inspection range WA1 and the second inspection range WA2) aligned in the film width direction, every time the PTP film 25 is conveyed by a length corresponding to one PTP sheet 1 in the film conveying direction.

When the X-ray transmission image data is obtained with respect to the two PTP sheets 1 (the sheet main bodies 1a) as described above, the microcomputer 71 first performs an inspection image obtaining process at step S11.

More specifically, out of X-ray transmission image data with respect to the sheet main bodies 1a (the inspection areas Kb) of two PTP sheets 1 obtained from the two inspection ranges WA (the first inspection range WA1 and the second inspection range WA2) aligned in the film width direction of the PTP film 25, the microcomputer 71 reads X-ray transmission image data with respect to the sheet main body 1a (inspection area Kb) of one PTP sheet 1, which is subjected to an inspection in this cycle of the routine, as an inspection image from the image data storage device 74.

The microcomputer 71 subsequently performs a binarization process at step S12. More specifically, the microcomputer 71 binarizes the X-ray transmission image data obtained as the inspection image at step S11 described above, by a tablet abnormality detection level to generate binarized image data, and stores this generated binarized image data as binarized image data for tablet inspection into the image data storage device 74. The X-ray transmission image data is converted into the binarized image data with setting, for example, the tablet abnormality detection level of not less than a first threshold value δ1 to "1 (light portion)" and the tablet abnormality detection level of less than the first threshold value δ1 to "0 (dark portion)".

The microcomputer 71 also binarizes the X-ray transmission image data obtained as the inspection image at step S11 described above, by a flange abnormality detection level to generate binarized image data, and stores this generated binarized image data as binarized image data for flange portion inspection into the image data storage device 74. The X-ray transmission image data is converted into the binarized image data with setting, for example, the flange abnormality detection level of not less than a second threshold value δ2 to "1 (light portion)" and the flange abnormality detection level of less than the second threshold value δ2 to "0 (dark portion)".

The microcomputer 71 then performs lump processing at step S13. More specifically, the microcomputer 71 processes the respective binarized image data obtained at step S12 described above, by the lump processing. The lump processing performed includes a process of specifying linkage components with respect to "0 (dark portions)" and linkage components with respect to "1 (light portions)" in the binarized image data and a labeling process of labeling the respective linkage components. The occupied area of each of the specified linkage components is expressed by the number of dots corresponding to the pixels of the X-ray line sensor camera 53.

The microcomputer 71 subsequently performs an inspection object specification process at step S14.

More specifically, the microcomputer 71 specifies a linkage component corresponding to the tablet 5, i.e., a tablet area, among the linkage components of "0 (dark portions)" specified by the lump processing of step S13 described above, based on the binarized image data for tablet inspection. The linkage component corresponding to the tablet 5 may be specified by determining a linkage component including a predetermined coordinate, a linkage component having a predetermined shape, a linkage component having a predetermined area or the like.

The microcomputer 71 also specifies any linkage component of "0 (dark portion)" specified by the lump processing of step S13 described above, based on the binarized image data for flange portion inspection, as a linkage component corresponding to a foreign substance, i.e., a foreign substance area.

The microcomputer 71 then performs a masking process at step S15.

More specifically, the microcomputer 71 sets the sheet frame described above and defines the above inspection area Kb on the binarized image data for tablet inspection; sets the pocket frames described above corresponding to the positions of the ten pocket portions 2 on the binarized image data; and performs a masking process for a remaining area other than pocket areas thus specified, i.e., for an area corresponding to the flange portion 3a. Image data after this masking process is stored as masking image data for tablet inspection into the image data storage device 74.

The microcomputer 71 also sets the sheet frame described above and defines the above inspection area Kb on the binarized image data for flange portion inspection; sets the pocket frames described above corresponding to the positions of the ten pocket portions 2 on the binarized image data; and performs a masking process for pocket areas thus specified. Image data after this masking process is stored as masking image data for flange portion inspection into the image data storage device 74.

According to one or more embodiments, the set positions of the sheet frame and the pocket frame described above are determined in advance according to their relative positional relations to the PTP film 25. According to one or more embodiments, the set positions of the sheet frame and the pocket frame are thus not subjected to positioning or position adjustment every time according to an inspection image. This configuration is, however, not essential. Another employable configuration may appropriately adjust the set positions of the sheet frame and the pocket frame, based on information obtained from the inspection image by taking into account the occurrence of a positional misalignment or the like.

The microcomputer 71 subsequently sets a tablet non-defective flag to a value "0" for all the pocket portions 2 at step S16.

The "tablet non-defective flag" indicates the result of good/poor quality judgment with respect to a tablet 5 placed in each corresponding pocket portion 2 and is set in the calculation result storage device 75. In the case where a tablet 5 placed in a predetermined pocket portion 2 is determined as non-defective, the tablet non-defective flag corresponding to this tablet 5 is set to a value "1".

At subsequent step S17, the microcomputer 71 sets a value C of a pocket number counter provided in the calculation result storage device 75 to an initial value "1".

The "pocket number" denotes a serial number set corresponding to each of the ten pocket portions 2 included in the inspection area Kb with respect to one PTP sheet 1. The position of each pocket portion 2 is identifiable by the value C of the pocket number counter (hereinafter simply referred to as the "pocket number C").

The microcomputer 71 subsequently determines whether the pocket number C is equal to or less than a number of pockets N ("10" according to one or more embodiments) in each inspection area Kb (in each PTP sheet 1) at step S18.

In the case of a positive determination, the microcomputer 71 proceeds to step S19 to extract any lump having an area value of the above tablet area (linkage component) that is equal to or larger than a reference tablet area value Lo (remove any lump having the area value of smaller than Lo) in the pocket portion 2 corresponding to a current pocket number C (for example, C=1), based on the masking image data for tablet inspection described above.

The microcomputer 71 subsequently determines whether the number of lumps in the above pocket portion 2 is equal to "1" or not at step S20. In the case of a positive determination, i.e., when the number of lumps is equal to "1", the microcomputer 71 proceeds to step S21. In the case of a negative determination, on the other hand, the microcomputer 71 regards the tablet 5 placed in the pocket portion 2 corresponding to the current pocket number C as defective and directly proceeds to step S23.

At step S21, the microcomputer 71 determines whether the shape, the length, the area and the like of the tablet 5 are appropriate. In the case of a positive determination, the microcomputer 71 proceeds to step S22. In the case of a negative determination, on the other hand, the microcomputer 71 regards the tablet 5 placed in the pocket portion 2 corresponding to the current pocket number C as defective and directly proceeds to step S23.

The microcomputer 71 regards the tablet 5 placed in the pocket portion 2 corresponding to the current pocket number C as non-defective and sets the tablet non-defective flag corresponding to the current pocket number C to "1" at step S22 and then proceeds to step S23.

The microcomputer 71 subsequently adds "1" to the current pocket number C at step S23 and goes back to step S18.

When the newly set pocket number C is still equal to or smaller than the number of pockets N ("10" according to one or more embodiments), the microcomputer 71 proceeds to step S19 again and repeatedly performs the series of tablet inspection process described above.

When it is determined that the newly set pocket number C exceeds the number of pockets N, on the other hand, the microcomputer 71 regards that the good/poor quality judgment process is terminated with regard to the tablets 5 placed in all the pocket portions 2 and proceeds to step S24.

At step S24, the microcomputer 71 determines whether the flange portion 3a is non-defective. More specifically, the microcomputer 71 determines, for example, whether there is any foreign substance having the size equal to or larger than a predetermined size in the area of the flange portion 3a, based on the masking image data for flange portion inspection.

In the case of a positive determination, the microcomputer 71 proceeds to step S25. In the case of a negative determination, i.e., when it is determined that the flange portion 3a has any abnormality, the microcomputer 71 directly proceeds to step S27.

At step S25, the microcomputer 71 determines whether the value of the tablet non-defective flag is equal to "1" for all the pocket portions 2 included in the inspection area Kb. This determines whether the PTP sheet 1 corresponding to this inspection area Kb is a non-defective or a defective.

In the case of a positive determination, i.e., when the tablets 5 placed in all the pocket portions 2 included in the inspection area Kb are "non-defective" and there is no tablet 5 (no pocket portion 2) determined as "defective" in the inspection area Kb, the microcomputer 71 determines that the PTP sheet 1 corresponding to this inspection area Kb is a "non-defective" at step S26 and then terminates this inspection routine.

In the case of a negative determination at step S25, i.e., when there is any tablet 5 (any pocket portion 2) determined as "defective" in the inspection area Kb, on the other hand, the microcomputer proceeds to step S27.

The microcomputer 71 determines that the PTP sheet 1 corresponding to this inspection area Kb is a "defective" at step S27 and then terminates this inspection routine.

The microcomputer 71 stores the result of the inspection with respect to the PTP sheet 1 corresponding to the inspection area Kb in the non-defective determination process of step S26 or in the defective determination process of step S27, into the calculation result storage device 75 and outputs the result of the inspection to the PTP packaging machine 10 (including the defective sheet discharge mechanism).

As described above in detail, the configuration of one or more embodiments irradiates the continuously conveyed PTP film 25 with the X-ray radiated from the respective X-ray irradiators 51 and 52, takes an image of the X-ray transmitted through the PTP film 25 with the X-ray line sensor camera 53 every time the PTP film 25 is conveyed by the predetermined amount, and performs an inspection with respect to the PTP sheet 1, based on the obtained X-ray transmission image data.

More specifically, in the configuration of one or more embodiments, the arrangement of the two X-ray irradiators 51 and 52 (the first X-ray irradiator 51 and the second X-ray irradiator 52) to be arrayed in the width direction of the PTP film 25 keeps the irradiation range of the X-ray to a wide range in the width direction of the PTP film 25 without increasing the irradiation angle θ (spread in the film width direction) of the X-ray radiated from each of the X-ray irradiators 51 and 52 compared with the conventional irradiation angle, while shortening the distance between each of the X-ray irradiators 51 and 52 and the PTP film 25 compared with the conventional distance. As a result, this arrangement allows for downsizing of the X-ray inspection device 45.

Furthermore, the shorter distance between each of the X-ray irradiators 51 and 52 and the PTP film 25 ensures a sufficient transmission amount of X-ray required for the inspection and improves the inspection accuracy. Additionally, this arrangement allows for downsizing of the X-ray irradiators 51 and 52 and thereby allows for further downsizing of the X-ray inspection device 45.

Moreover, in the configuration of one or more embodiments, the X-ray radiated from the first X-ray irradiator 51 located on one side in the film width direction and transmitted through the PTP film 25 and the X-ray radiated from the second X-ray irradiator 52 located on the other side in the film width direction and transmitted through the PTP film 25 are set not to overlap with each other on one X-ray line sensor camera 53.

This configuration enables an inspection for the first inspection range WA1 on one side in the film width direction to be performed without being affected by the X-ray radiated from the second X-ray irradiator 52 on the other side in the film width direction. Similarly, this configuration enables an inspection for the second inspection range WA2 on the other side in the film width direction to be performed without being affected by the X-ray radiated from the first X-ray irradiator 51 on one side in the film width direction. As a result, this configuration improves the inspection accuracy.

Moreover, in the configuration of one or more embodiments, the boundary between the first X-ray irradiation range that is irradiated with the X-ray from the first X-ray irradiator 51 and the second X-ray irradiation range that is irradiated with the X-ray from the second X-ray irradiator 52 is set in the center-portion predetermined range WB that is the non-inspection range provided between the first inspection range WA1 and the second inspection range WA2. More specifically, the first X-ray irradiator 51, the second X-ray irradiator 52 and the X-ray line sensor camera 53 are arranged to satisfy the relationship of Expression ($\alpha$) given above.

This configuration enables the entirety of the first inspection range WA1 and the second inspection range WA2 set in the width direction of the PTP film 25 to be irradiated with the X-ray, even in the case where the X-ray radiated from the first X-ray irradiator 51 and transmitted through the first inspection range WA1 and the X-ray radiated from the second X-ray irradiator 52 and transmitted through the second inspection range WA2 are set not to overlap with each other on one X-ray line sensor camera 53.

The present disclosure is not limited to the description of the above respective embodiments but may be implemented, for example, by configurations described below. The present disclosure may also be naturally implemented by applications and modifications other than those illustrated below.

(a) The configuration of the packaging sheet as the inspection object is not limited to the PTP sheet 1 of the above embodiments. For example, the inspection object may be an SP sheet.

Figure 9:
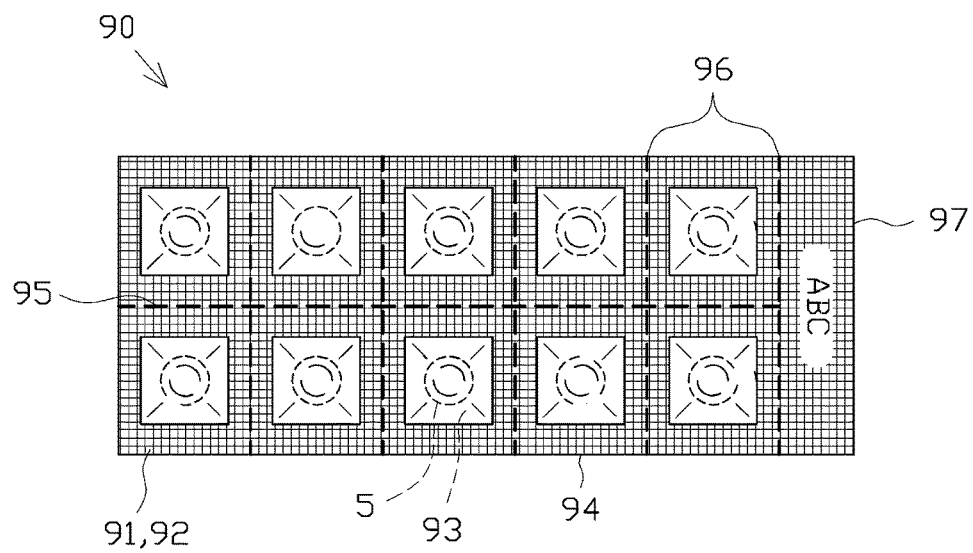
FIG. 9 is a plan view illustrating an SP sheet.

As shown in FIG. 9, a general SP sheet 90 is formed by laying two belt-like films 91 and 92 made of an aluminum-based opaque material one over the other, filling tablets 5 between the two films 91 and 92, joining the two films 91 and 92 with each other in peripheries of bag-like spaces 93 (shaded areas in FIG. 9) with leaving the bag-like spaces 93 around the tablets 5 to form a belt-like packaging film, and separating the packaging film in the unit of rectangular sheets.

The SP sheet 90 has a vertical perforation 95 formed along a sheet longitudinal direction and lateral perforations 96 formed along a sheet short side direction, as separation lines for separating the SP sheet 90 in the unit of small sheet pieces 94, each including one space 93. Furthermore, the SP sheet 90 is provided with a tag portion 97 with various pieces of information (a letter string "ABC" according to one or more embodiments) printed thereon, at one end in the sheet longitudinal direction.

(b) The arrangement and the number of the pocket portions 2 in one unit of PTP sheet 1 are not limited to the configuration of the above embodiments (the total of ten pocket portions 2 arrayed in two lines). The present disclosure may be applied to a PTP sheet having any of various arrangements and any number of pocket portions, for example, a PTP sheet having a total of twelve pocket portions 2 (spaces 2a) arrayed in three lines (the same applies to the SP sheet described above). The number of pocket portions (spaces) included in one small sheet piece is also not limited to the configuration of the above embodiments.

(c) The PTP sheet 1 according to the above embodiments has the perforations 7 formed by intermittently aligning the cuts penetrating in the thickness direction of the PTP sheet 1, as the separation lines. The separation lines are, however, not limited to this configuration, but a different configuration may be employed according to the materials of the container film 3 and the cover film 4 and the like. For example, another configuration may form non-penetrating separation lines such as slits having an approximately V-shaped cross section (half separation lines). Another configuration may form no separation lines such as the perforations 7.

Furthermore, in the configuration of the above embodiments, the constricted portions 8 are formed corresponding to the positions where the perforations 7 are formed in the periphery of the PTP sheet 1. Another configuration may omit the constricted portions 8.

(d) The materials, the layered structure and the like of the first film and the second film are not limited to the configuration of the container film 3 and the cover film 4 according to the embodiments described above. For example, in the configuration of the above embodiments, the container film 3 and the cover film 4 are made by using the metal material such as aluminum as the base material. This is, however, not essential, but another materials may be employed. For example, a synthetic resin material that does not allow for transmission of visible light and the like may be employed.

(e) The configuration of the packaging film is not limited to the configuration of the above embodiments, but another configuration may be employed.

For example, in the configuration of the above embodiments, two PTP sheets 1 are manufactured simultaneously in the width direction of the PTP film 25. In place of this configuration, another configuration may be employed to manufacture three or more PTP sheets 1 simultaneously in the width direction of the PTP film 25.

Figure 10:
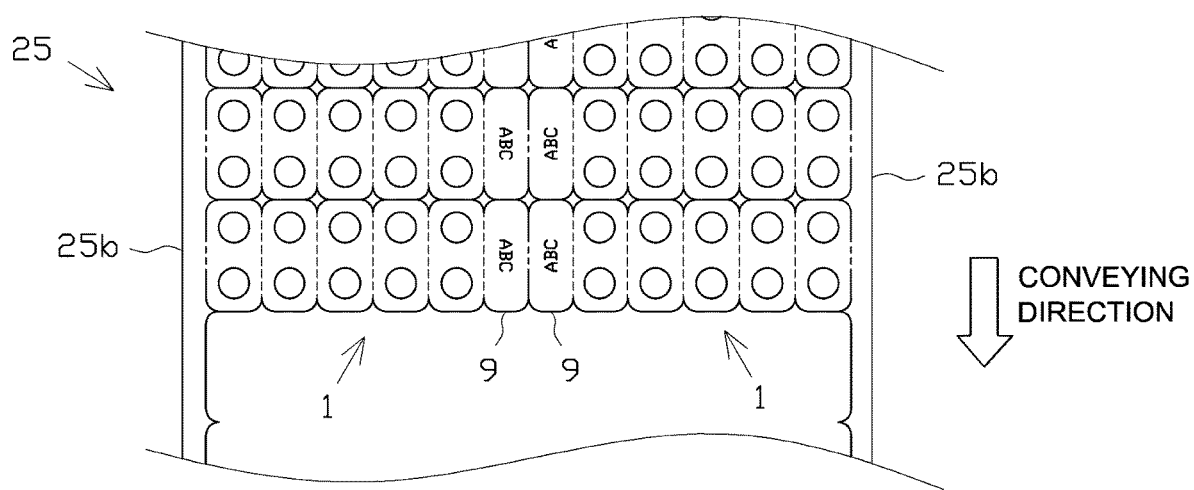
FIG. 10 is a schematic configuration diagram illustrating a layout of a PTP film according to one or more embodiments.

In the layout of the PTP film 25 according to the above embodiments, the center scrap 25a is present between the two sheet punchout ranges Ka aligned in the film width direction. This configuration is, however, not essential. As shown in FIG. 10, in another layout with omission of the center scrap 25a, areas corresponding to the tag portions 9 of the two PTP sheets 1 aligned in the film width direction may be arranged to be directly connected with each other. In this layout, a center-portion predetermined range in the film width direction including an area corresponding to the two adjacent tag portions 9 is the "non-inspection range (inspection-free range)".

Figure 11:
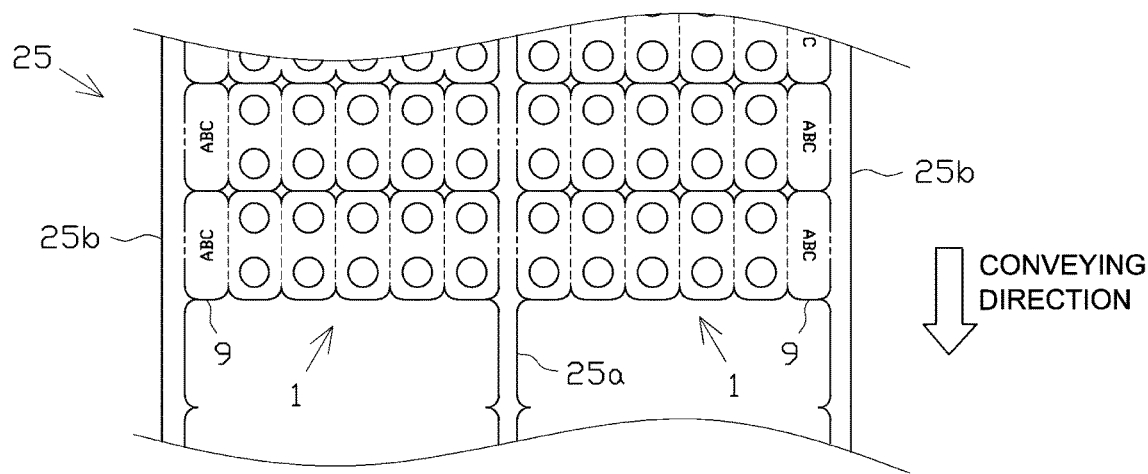
FIG. 11 is a schematic configuration diagram illustrating a layout of a PTP film according to one or more embodiments.

According to the embodiments described above, in the PTP film 25, the two PTP sheets 1 aligned in the film width direction respectively have the tag portions 9 arranged to face the central area in the film width direction and to be adjacent to the center scrap 25a. This configuration is, however, not essential. As shown in FIG. 11, in another layout, the tag portions 9 of the two PTP sheets aligned in the film width direction may be arranged to respectively face outward in the film width direction and to be adjacent to the side scraps 25b. In this layout, a center-portion predetermined range in the film width direction including an area corresponding to the center scrap 25a is the "non-inspection range (inspection-free range)".

Figure 12:
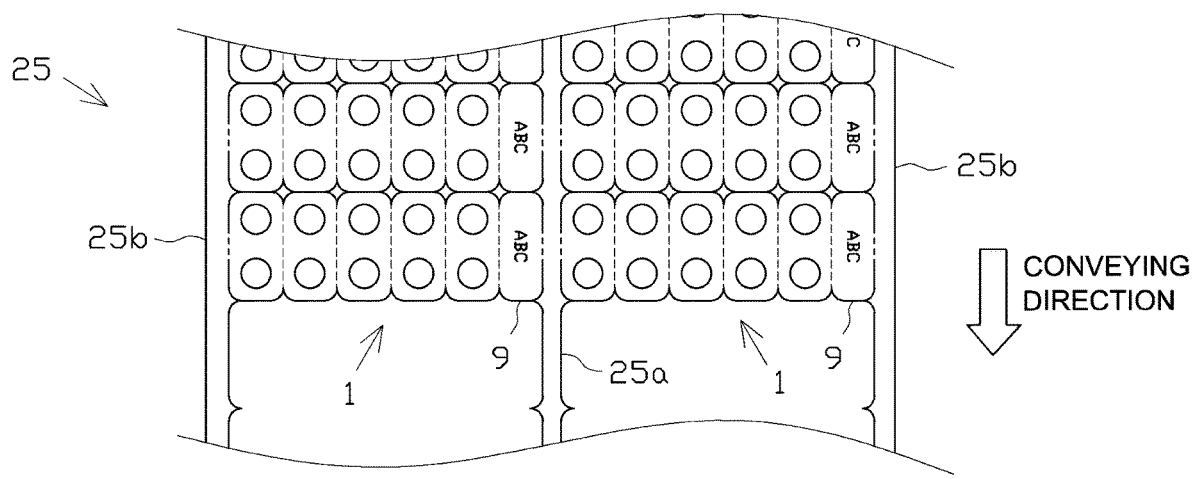
FIG. 12 is a schematic configuration diagram illustrating a layout of a PTP film according to one or more embodiments.
Figure 13:
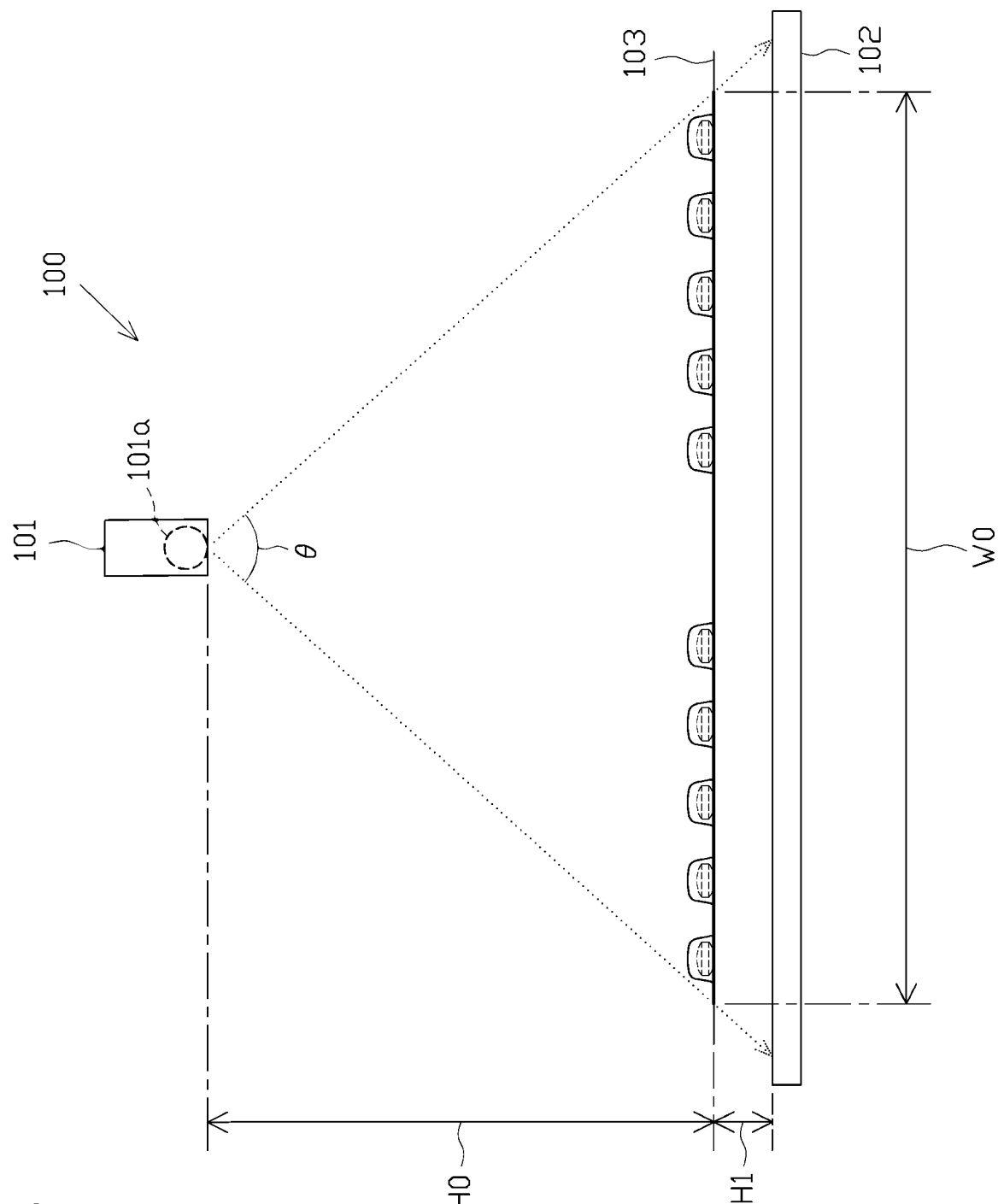
FIG. 13 is a schematic diagram illustrating a positional relationship between an X-ray irradiator, an X-ray line sensor camera and a PTP film in a conventional X-ray inspection device.

As shown in FIG. 12, in another layout, out of the two PTP sheets 1 aligned in the film width direction, one PTP sheet 1 may have the tag portion 9 arranged to face the central area in the film width direction and to be adjacent to the center scrap 25a, and the other PTP sheet 1 may have the tag portion 9 arranged to face outward in the film width direction and to be adjacent to the side scrap 25b. In this layout, a center-portion predetermined range in the film width direction including an area corresponding to the center scrap 25a and one tag portion 9 adjacent to the center scrap 25a is the "non-inspection range (inspection-free range)" on the center side.

(f) The configuration of the electromagnetic wave irradiation unit is not limited to the configuration of the above embodiments. The above embodiments are configured to radiate X-ray as the electromagnetic wave. This configuration is, however, not essential. Another configuration may use another electromagnetic wave that transmits through the PTP film 25, for example, terahertz electromagnetic wave.

(g) The configuration of the imaging unit is not limited to the configuration of the above embodiments. For example, the above embodiments employ the scintillator-based CCD camera (the X-ray line sensor camera 53) as the imaging unit. This is, however, not essential. A camera configured to take an image of directly incident X-ray may be employed as the imaging unit.

The above embodiments employ the X-ray line sensor camera 53 having CCDs arrayed in a line, as the imaging unit. Using the X-ray line sensor camera is, however, not essential. For example, an X-ray TDI (time delay integration) camera including multiple arrays of CCDs (arrays of detection elements) in the film conveying direction of the PTP film 25 may be employed as the imaging unit. This further improves the inspection accuracy and the inspection efficiency.

(h) The configuration, the layout position and the like of the X-ray inspection device 45 are not limited to those of the embodiments described above.

For example, in the configuration of the above embodiments, the X-ray inspection device 45 is placed at the position where the PTP film 25 is conveyed in the vertical direction. This configuration is, however, not essential. For example, the X-ray inspection device 45 may be placed at a position where the PTP film 25 is conveyed in the horizontal direction or at a position where the PTP film 25 is conveyed obliquely.

At least one of the first X-ray irradiator 51, the second X-ray irradiator 52 and the X-ray line sensor camera 53 may be provided with a position adjustment mechanism (position adjustment unit) configured to adjust the position thereof in at least one direction out of the film width direction, the film conveying direction and the film normal direction, according to the size and the layout of the PTP film 25. This enhances the versatility of the X-ray inspection device 45 and improves the inspection accuracy.

Even in the case where the non-inspection range has a relatively narrow width dimension, for example, when only the area corresponding to the center scrap 25a is the non-inspection range (as shown in FIG. 11), the adjustment of decreasing the distance between the X-ray line sensor camera 53 and the PTP film 25 and increasing the distance between the X-ray irradiators 51 and 52 and the PTP film 25 allows for an appropriate inspection without narrowing the irradiation angle θ of x-ray radiated from the X-ray irradiators 51 and 52.

(i) The layout configuration of the electromagnetic wave irradiation unit and the imaging unit is not limited to that of the embodiments described above.

For example, according to the embodiments described above, the X-ray irradiators 51 and 52 (the first X-ray irradiator 51 and the second X-ray irradiator 52) are placed on the container film 3-side of the PTP film 25, and the X-ray line sensor camera 53 is placed on the cover film 4-side of the PTP film 25. The positional relationship between the respective components may, however, be reversed. The X-ray irradiators 51 and 52 may be placed on the cover film 4-side, and the X-ray line sensor camera 53 may be placed on the container film 3-side.

The layout configuration of the first X-ray irradiator 51, the second X-ray irradiator 52, and the X-ray line sensor camera 53 is not limited to the layout configuration satisfying the relationship of Expression (α) given above but may be another layout configuration.

Any layout configuration may be employed as long as the layout configuration causes at least the boundary between the first X-ray irradiation range where the X-ray is radiated from the first X-ray irradiator 51 and the second X-ray irradiation range where the X-ray is radiated from the second X-ray irradiator 52 to be set in the non-inspection range (center-portion predetermined range) WB provided between the first inspection range WA1 and the second inspection range WA2 and causes the X-ray radiated from the first X-ray irradiator 51 and transmitted through the first inspection range WA1 and the X-ray radiated from the second X-ray irradiator 52 and transmitted through the second inspection range WA2 not to overlap with each other on one X-ray line sensor camera 53.

For example, in the configuration of the above embodiments, the X-ray radiated from the first X-ray irradiator 51 and transmitted through the first boundary PB1 and the X-ray radiated from the second X-ray irradiator 52 and transmitted through the second boundary PB2 intersect with each other at the center position in the film width direction of the non-inspection range WB on the X-ray line sensor camera 53. In a modified configuration, the X-ray radiated from the first X-ray irradiator 51 and transmitted through the first boundary PB1 and the X-ray radiated from the second X-ray irradiator 52 and transmitted through the second boundary PB2 may not intersect with each other on the X-ray line sensor camera 53, depending on the width dimension of the non-inspection range, for example, in the case where the width dimension of the non-inspection range WB is set to a relatively large value.

Furthermore, in the configuration of the above embodiments, the other-side end in the film width direction of the first X-ray irradiation range that is irradiated with the X-ray from the first X-ray irradiator 51 located on one side in the film width direction is set in the first boundary PB1 that is the boundary between the first inspection range WA1 and the non-inspection range WB. The one-side end in the film width direction of the second X-ray irradiation range that is irradiated with the X-ray from the second X-ray irradiator 52 located on the other side in the film width direction is set in the second boundary PB2 that is the boundary between the second inspection range WA2 and the non-inspection range WB.

This configuration is, however, not essential. In a modified configuration, the other-side end in the film width direction of the first X-ray irradiation range that is irradiated with the X-ray from the first X-ray irradiator 51 located on one side in the film width direction may be set in the non-inspection range WB, depending on the width dimension of the non-inspection range, for example, in the case where the width dimension of the non-inspection range WB is set to a relatively large value. Similarly, the one-side end in the film width direction of the second X-ray irradiation range that is irradiated with the X-ray from the second X-ray irradiator 52 located on the other side in the film width direction may be set in the non-inspection range WB.

In the configuration of the above embodiments, the irradiation angle θ of X-ray radiated from the first X-ray irradiator 51 (the incident angle φ1 of X-ray in the first boundary PB1) is equal to the irradiation angle θ of X-ray radiated from the second X-ray irradiator 52 (the incident angle φ2 of X-ray in the second boundary PB2). In another configuration, however, these irradiation angles may be different from each other according to the layout of the PTP film 25 (for example, the position of the non-inspection range in the film width direction), for example, according to the non-symmetrical layout of the PTP film 25 in the film width direction like the example shown in FIG. 12.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1 . . . PTP sheet, 1*a* . . . sheet main body, 2 . . . pocket portion, 2*a* . . . space, 3 . . . container film, 4 . . . cover film, 5 . . . tablet, 6 . . . small sheet piece, 7 . . . perforation, 8 . . . constricted portion, 9 . . . tag portion, 10 . . . PTP packaging machine, 25 . . . PTP film, 25*a* . . . center scrap, 25*b* . . . side scrap, 45 . . . X-ray inspection device, 51 . . . first X-ray irradiator, 52 . . . second X-ray irradiator, 51*a*, 52*a* . . . X-ray sources, 51*b*, 52*b* . . . collimators, 53 . . . X-ray line sensor camera, 54 . . . control processing device, 71 . . . microcomputer, 74 . . . image data storage device, H1 . . . distance between the X-ray line sensor camera and the PTP film, Ka . . . sheet punchout range, Kb . . . inspection area, PB1 . . . first boundary, PB2 . . . second boundary, WA1 . . . first inspection range (first X-ray irradiation range), WA2 . . . second inspection range (second X-ray irradiation range), WB . . . non-inspection range (inspection-free range), φ1 . . . incident angle of X-ray in the first boundary, φ2 . . . incident angle of X-ray in the second boundary

The invention claimed is:

1. A packaging sheet manufacturing apparatus comprising:
an inspection device that inspects a packaging film in a belt-like form, wherein the packaging film comprises a first film made of an opaque material and a second film made of an opaque material attached to each other; and tablets disposed in a space between the first film and the second film, the inspection device comprising:
a first X-ray irradiator that irradiates, with an X-ray from a first film-side, a first inspection range that corresponds to a position of a first tablet portion of a first packaging sheet including at least one of the tablets;
a second X-ray irradiator that irradiates, with an X-ray from the first film-side, a second inspection range that corresponds to a position of a second tablet portion of a second packaging sheet including at least one of the tablets;
an imaging device that is disposed on a second film-side and opposed to the first and second X-ray irradiators across the packaging film, that comprises an X-ray detector comprising a plurality of detection elements arrayed along a film width direction and detecting the X-ray transmitted through the packaging film, and that successively outputs X-ray transmission image data obtained every time the packaging film is conveyed by a predetermined amount; and
a controller that inspects the first and second packaging sheets based on the X-ray transmission image data obtained by the imaging device, wherein
the first and second X-ray irradiators are aligned in the film width direction spaced apart from each other at a predetermined distance and emit the X-ray having a predetermined irradiation angle not to irradiate a center-portion range between a first irradiation range corresponding to the first inspection range and a second irradiation range corresponding to the second inspection range,
a width of the center-portion range correspond to a non-inspection range that includes a first tag portion not including the tablets and adjacent to the first tablet portion of the first packaging sheet and that includes a second tag portion not including the tablets and adjacent to the second tablet portion of the second packaging sheet, and
the X-ray radiated from the first X-ray irradiator and transmitted through the first inspection range and the X-ray radiated from the second X-ray irradiator and transmitted through the second inspection range do not overlap with each other on the imaging device; and
a sheet punching device that punches out, from the packaging film, the first packaging sheet including the first tablet portion and the first tag portion, and the second packaging sheet including the second tablet portion and the second tag portion.

2. The packaging sheet manufacturing apparatus according to claim 1, wherein
center axes of the first and second X-ray irradiators are parallel to a normal direction of the packaging film.

3. The packaging sheet manufacturing apparatus according to claim 2, wherein
the first film and the second film are made by using aluminum as a base material.

4. The packaging sheet manufacturing apparatus according to claim 1, wherein
the first film and the second film are made by using aluminum as a base material.

5. The packaging sheet manufacturing apparatus according to claim 1, wherein
the first X-ray irradiator is disposed such that a center axis of the first X-ray irradiator is set at a center position of the first inspection range in the film width direction,
the second X-ray irradiator is disposed such that a center axis of the second X-ray irradiator is set at a center position of the second inspection range in the film width direction,
the imaging device outputs the X-ray transmission image data of the first and second inspection ranges in a time-series order, and
the controller stores, in a storage, the X-ray transmission image data together with position information in a film conveying direction and in the film width direction.

* * * * *